(12) United States Patent
Dusterhoft et al.

(10) Patent No.: US 11,668,170 B2
(45) Date of Patent: *Jun. 6, 2023

(54) ENHANCED OIL RECOVERY HARVESTING FOR FRACTURED RESERVOIRS

(71) Applicant: Halliburton Energy Services, Inc., Houston, TX (US)

(72) Inventors: Ronald Glen Dusterhoft, Houston, TX (US); Travis Hope Larsen, Houston, TX (US); Denise Nicole Benoit, Houston, TX (US); Enrique Antonio Reyes, Houston, TX (US); Antonio Recio, III, Houston, TX (US); Aaron Michael Beuterbaugh, Houston, TX (US); Tatyana Vladimirov Khamatnurova, Houston, TX (US); Jun Su An, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/527,743

(22) Filed: Nov. 16, 2021

(65) Prior Publication Data

US 2022/0162930 A1 May 26, 2022

Related U.S. Application Data

(60) Provisional application No. 63/117,837, filed on Nov. 24, 2020.

(51) Int. Cl.
E21B 43/16 (2006.01)
E21B 43/26 (2006.01)
C09K 8/584 (2006.01)

(52) U.S. Cl.
CPC .............. E21B 43/16 (2013.01); C09K 8/584 (2013.01); E21B 43/26 (2013.01)

(58) Field of Classification Search
CPC ...................................................... E21B 43/16
See application file for complete search history.

(56) References Cited

U.S. PATENT DOCUMENTS 4,747,974 A 5/1988 Ritter
5,019,343 A 5/1991 Hwa et al.
(Continued)

FOREIGN PATENT DOCUMENTS

CN 103224776 A 7/2013
WO 2014193720 A1 12/2014
(Continued)

OTHER PUBLICATIONS

Office Action dated Feb. 1, 2023 (24 pages), U.S. Appl. No. 17/527,736, filed Nov. 16, 2021.
(Continued)

Primary Examiner — William D Hutton, Jr.
Assistant Examiner — Avi T Skaist
(74) Attorney, Agent, or Firm — Conley Rose, P.C.; Rodney B. Carroll

(57) ABSTRACT

A method of producing natural resources from a wellbore penetrating a subterranean formation with a Huff and Puff process comprising: (a) placing a recovery enhancing fluid system into the wellbore during an injection (Huff) period of time wherein placing the recovery enhancing fluid system comprises injecting under pressure; (b) ceasing injection of the recovery enhancing fluid system and allowing the composition to soak in the subterranean formation for a soak period of time; (c) producing fluids from the subterranean formation during a production (Puff) period of time; and (d)
(Continued)

optionally repeating steps (a) to (c) for a plurality of Huff, soak, and Puff periods of time, respectively.

21 Claims, 7 Drawing Sheets

(56) References Cited

U.S. PATENT DOCUMENTS

| | | | |
|---|---|---|---|
| 5,171,460 | A | 12/1992 | Underdown |
| 6,716,799 | B1 | 4/2004 | Mueller et al. |
| 9,033,033 | B2 | 5/2015 | Thomas et al. |
| 9,670,397 | B2 | 6/2017 | Ghumare et al. |
| 10,711,181 | B2 | 7/2020 | Beuterbaugh et al. |
| 2009/0084554 | A1 | 4/2009 | Williamson et al. |
| 2016/0024372 | A1* | 1/2016 | Fathi Najafabadi ..... C09K 8/58 166/279 |
| 2016/0032174 | A1 | 2/2016 | Fuller et al. |
| 2017/0240797 | A1 | 8/2017 | Lablanc et al. |
| 2018/0258342 | A1 | 9/2018 | Nguyen et al. |
| 2018/0273832 | A1 | 9/2018 | Lablanc et al. |
| 2019/0264097 | A1 | 8/2019 | Dusterhoft et al. |
| 2019/0277112 | A1 | 9/2019 | Beuterbaugh et al. |
| 2020/0056087 | A1 | 2/2020 | Nizamidin et al. |
| 2020/0190396 | A1 | 6/2020 | Reyes et al. |
| 2021/0355370 | A1* | 11/2021 | Recio, III ............... C09K 8/584 |

FOREIGN PATENT DOCUMENTS

| | | |
|---|---|---|
| WO | 2016195653 A1 | 12/2016 |
| WO | 2013005095 A1 | 3/2019 |
| WO | 2020028567 A1 | 2/2020 |
| WO | 2020101644 A1 | 5/2020 |
| WO | 2020101649 A1 | 5/2020 |
| WO | 2020101719 A1 | 5/2020 |
| WO | 2020117269 A1 | 6/2020 |

OTHER PUBLICATIONS

Office Action dated Feb. 13, 2023 (21 pages), U.S. Appl. No. 17/527,746, filed Nov. 16, 2021.
Recio III, Antonio et al., Filing Receipt, Specification and Drawings for U.S. Appl. No. 63/117,832, filed Nov. 24, 2020, titled "Method For Improved Oil Recovery in Subterranean Formations With Circumneutral pH Flood," 24 pages.
Beuterbaugh, Aaron et al., Filing Receipt, Specification and Drawings for U.S. Appl. No. 63/117,834, filed Nov. 24, 2020, titled "Composition And Methods For Improving Hydrocarbon Mobility in Enhanced Oil Recovery Operations," 26 pages.
Recio III, Antonio et al., Filing Receipt, Specification and Drawings for U.S. Appl. No. 63/117,835, filed Nov. 24, 2020, titled "Reactive Surfactant Flooding at Neutral pH," 26 pages.
Dusterhoft, Ronald Glen, Filing Receipt, Specification and Drawings for U.S. Appl. No. 63/117,837, filed Nov. 24, 2020, titled "Enhanced Oil Recovery Harvesting for Fractured Reservoirs," 30 pages.
Benoit, Denise et al., Filing Receipt, Specification and Drawings for U.S. Appl. No. 63/117,839, filed Nov. 24, 2020, titled "Method For Improved Oil Recovery in Unconventional Subterranean Formations," 21 pages.
Benoit, Denise Nicole et al., Filing Receipt, Specification and Drawings for U.S. Appl. No. 63/117,842, filed Nov. 24, 2020, titled "Fluids For Single and Multi Pad Delivery," 34 pages.

Recio III, Antonio et al., Filing Receipt, Specification and Drawings for U.S. Appl. No. 17/527,736, filed Nov. 16, 2021, titled "Method For Improved Oil Recovery in Subterranean Formations With Circumneutral pH Flood," 60 pages.
Recio III, Antonio et al., Filing Receipt, Specification and Drawings for U.S. Appl. No. 17/527,739, filed Nov. 16, 2021, titled "Reactive Surfactant Flooding at Neutral pH," 57 pages.
Benoit, Denise Nicole et al., Filing Receipt, Specification and Drawings for U.S. Appl. No. 17/527,746, filed Nov. 16, 2021, titled "Fluids For Single and Multi Pad Delivery," 49 pages.
Electronic Acknowledgment Receipt, Specification and Drawings for International Patent Application No. PCT/US2021/59645, entitled "Method For Improved Oil Recovery in Subterranean Formations With Circumneutral Ph Flood," filed Nov. 17, 2021, 58 pages.
Electronic Acknowledgment Receipt, Specification and Drawings for International Patent Application No. PCT/US2021/59647, entitled "Reactive Surfactant Flooding at Neutral pH," filed Nov. 17, 2021, 56 pages.
Electronic Acknowledgment Receipt, Specification and Drawings for International Patent Application No. PCT/US2021/59650, entitled "Enhanced Oil Recovery Harvesting For Fractured Reservoirs," filed Nov. 17, 2021, 57 pages.
Kumar, Ashish et al., "Well Interference Diagnosis through Integrated Analysis of Tracer and Pressure Interference fests," Unconventional Resources Technology Conference, Jul. 23-25, 2018, 12 pages.
Mahmoud, M.A et al., "Chelating-Agent Enhanced Oil Recovery for Sandstone and Carbonate Reservoirs," Society of Petroleum Engineers, Jun. 2015, pp. 483-495, Society of Petroleum Engineers.
Hassan, Amjed M. et al., "Surface Charge Study of EDTA Interaction with Carbonate Rock During Chelating Agent Flooding," Journal of Petroleum Science and Engineering, Mar. 10, 2020, vol. 191, pp. 1-14, Elsevier.
Horeh, Mohsen Bahaloo et al., "Role of Brine Composition and Water-Soluble Components of Crude Oil on the Wettability Alteration of a Carbonate Surface," Energy & Fuels, 2019, vol. 33, pp. 3979-3988, ACS Publications.
Li, Wenhao et al., "Porosity Enhancement Potential through Dolomite Mineral Dissolution i the Shale Reservoir; A Case Study of an Argillaceous Dolomite Reservoir in the Jianghan Basin," Energy & Fuels, 2019, vol. 33, pp. 4857-4864, ACS Publications.
Austad, T. et al., "Low Salinity EOR Effects in Limestone Reservoir Cores Containing Anhydrite; A Discussion of the Chemical Mechanism," Energy & Fuels, Sep. 23, 2015, vol. 29, pp. 6903-6911, ACS Publications.
Zhang, Fan et al., "Hercules: Final Report," Feb. 14, 2020, 42 pages, Harold Vance Department of Peroleum Engineering.
"Quarterly Report," Mar. 31, 2016, 31 pages, United States Securities and Exchange Commission.
Foreign Communication from Related Application—International Search Report and Written Opinion of the International Searching Authority, International Application No. PCT/US2021/059645, dated Mar. 8, 2022, 11 pages.
Foreign Communication from Related Application—International Search Report and Written Opinion of the International Searching Authority, International Application No. PCT/US2021/059647, dated Mar. 8, 2022, 11 pages.
Foreign Communication from Related Application—International Search Report and Written Opinion of the International Searching Authority, International Application No. PCT/US2021/059650, dated Mar. 17, 2022, 12 pages.

* cited by examiner

ENHANCED OIL RECOVERY HARVESTING FOR FRACTURED RESERVOIRS

CROSS-REFERENCE TO RELATED APPLICATIONS

This application claims priority under 35 U.S.C. § 119(e) to U.S. Provisional Patent Application No. 63/117,837 filed on Nov. 24, 2020 and entitled "Enhanced Oil Recovery Harvesting for Fractured Reservoirs," the disclosure of which is hereby incorporated herein by reference in its entirety.

FIELD

This application relates to the recovery of natural resources from a wellbore penetrating a subterranean formation, and more specifically this application relates to compositions and methods used in improved or enhanced oil recovery (EOR) operations.

BACKGROUND

Hydrocarbon recovery factors (fraction of original oil in place, OOIP, or original gas in place, OGIP) in unconventional reservoirs vary as a function of fluid type; typically, less than about 10% for oil or 20-70% for gases and somewhere in between for gas condensates. In primary production of conventional reservoirs, hydrocarbon is recovered based on fluid transport caused by pressure drawdown at the well. Even using secondary recovery water flooding, the water will follow existing paths of low resistivity, primarily natural fractures, and not effectively sweep the rock matrix.

One EOR method, water injection, is one way of applying pressure support, but is not very effective in low permeability fractured carbonate reservoirs. Currently many of these lower permeability reservoirs are completed with multi-well pads to reduce surface facility costs and operating costs. These pads typically contain multiple wells that are drilled from one location all in close proximity to each other on the surface, but through the use of directional and horizontal drilling are capable of targeting a large region within the reservoir around the pad location.

Another EOR process commonly applied to a given well is a cyclic injection/production process (also referred to as Huff and Puff). Huff and Puff operations include cyclic steam injection or cyclic gas. For example, an injectant gas (e.g., separated gas from a nearby well or gas installation) is injected (the Huff phase) into a depleted or partially depleted oil well at a high enough pressure to achieve miscibility with the oil in the reservoir. The well is shut-in for a period of time referred to as the soak period, and during the soak period the miscible fluid spreads through the formation, swelling the oil volume and decreasing its viscosity. After the soak period, the well is put back on production (the Puff phase) with an expected increase in production rate due to the higher reservoir pressure and lower oil viscosity. The injectant gas recovered from the treated wellbore can then be sold, or separated and reinjected in another well to initiate a new Huff and Puff sequence.

In fractured carbonate reservoirs a vast majority of the oil in place is left in place or effectively bypassed due to the higher permeability fractures or channels that exist within these reservoir systems. Thus, an ongoing need exists for new compositions and methods fix improved oil recovery.

BRIEF DESCRIPTION OF DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
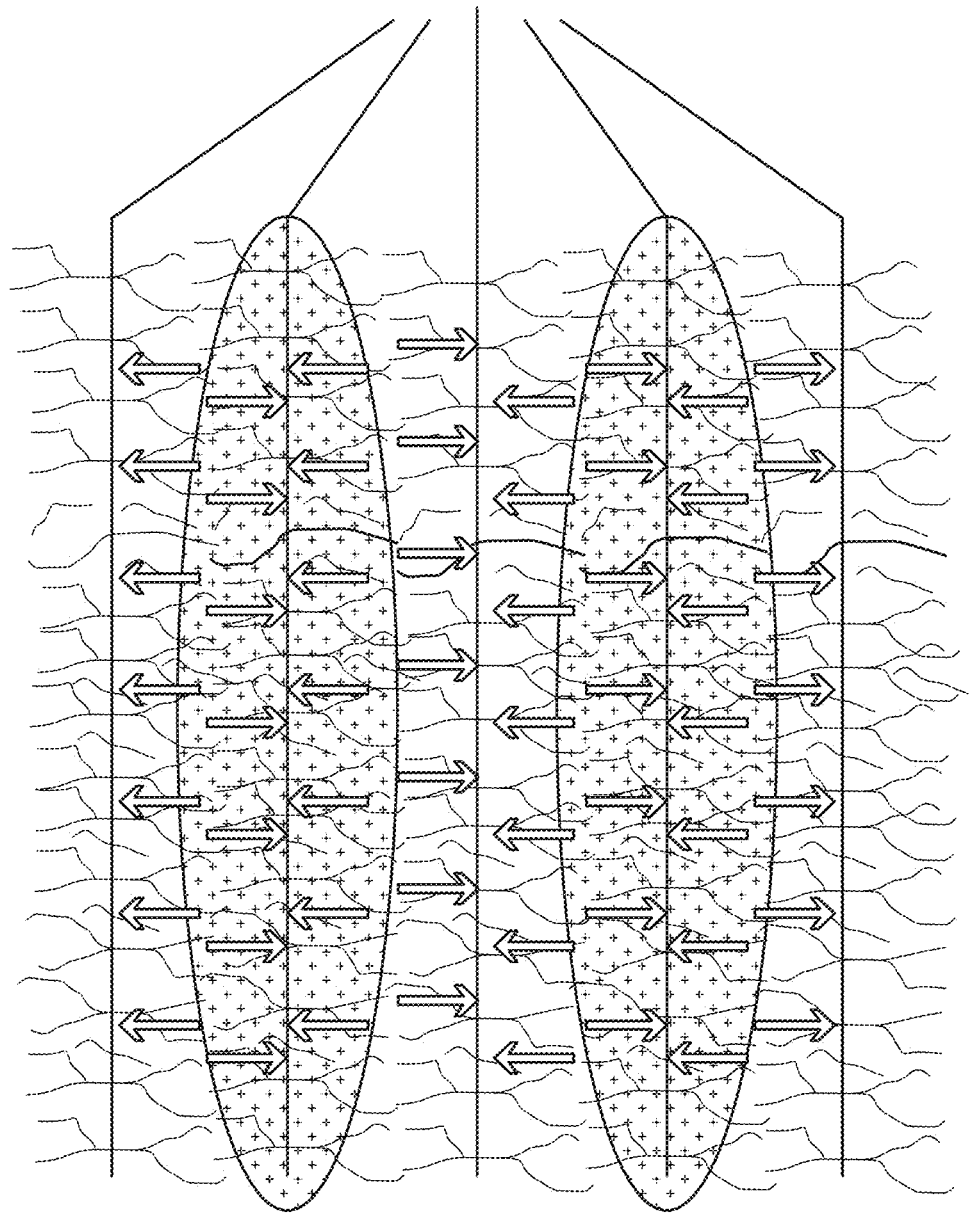
FIG. 1 depicts a 5 well pad where injection is occurring into 2 wells and the pressure support from this injection can improve pressure and production in the 3 offset wells.

Disclosed herein is a recovery enhancing fluid system (REFS). In some embodiments, the REFS comprises (i) a recovery enhancing agent (REA) comprising a phosphonoalkyl moiety, (ii) a surfactant, (iii) a miscible fluid and (iv) a base fluid. The present disclosure contemplates use of the REFS chemistry to induce higher rates of water imbibition into reservoir rocks to increase the native permeability and water-wet the rock surface to mobilize more oil from the matrix. The present disclosure also contemplates using liquified natural gas (LNG) along with the REFS to pump energized fluids into wellbores for this type of application (e.g., Huff and Puff applications).

In some embodiments, the REFS is introduced to a reservoir such as a nonconventional reservoir which is defined as any subterranean formation that has, or comprises, one of: (i) fractured reservoirs where the fracture can be naturally present or artificially created (hydraulic fracturing, "fracking"); (ii) the primary porosity is less than 10% (tight formations); (iii) high contrast reservoirs which can be a network of fractures or naturally present conduits or paths that provide hydraulic transport; (iv) a sandstone reservoir or (iv) any combination of (i)-(iv). In this context, there are discontinuous regimes of permeability that give rise to substantial differences, or contrast, of permeability domains. In some embodiments, the reservoir is an ultra-low permeability shale, for example a shale comprising carbonate or a carbonate rich shale.

In some embodiments the REA comprising a phosphonoalkyl moiety has the general formula

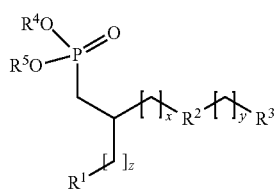

where $R^1$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonate, or a hydrogen atom; $R^2$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, a phosphonoalkyl/amine, or a hydrogen atom; $R^3$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonoalkyl/amine, or a hydrogen atom; $R^4$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a magnesium atom, a calcium atom, a strontium atom, a barium atom, a chromium atom, an iron atom, a manganese atom, a cobalt atom, a nickel atom, a copper atom, a gallium atom, an indium atom, or a hydrogen atom; $R^5$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a beryllium atom, a magnesium atom, a calcium atom, a strontium atom, a barium atom, a chromium atom, an iron atom, a manganese atom a cobalt atom, a nickel atom, a copper atom, a titanium atom, a zirconium atom, a gallium atom, an indium atom, or a hydrogen atom; x is 1 to 6; y is 0 to 6; and z is 1-6.

Examples of REAs suitable for use in the present disclosure include without limitation N-(phosphonomethyl) iminodiacetic acid (PMIDA) or salts thereof, N-(carboxymethyl)-N-(phosphonomethyl)glycine, glycine, N,N'-1,2-ethanediylbis(N-(phosphonomethyl), glyphosine, aminotrimethylene phosphonic acid, sodium aminotris(methylenephosphonate), N-(2-hydroxyethyl)iminobis (methylphosphonic acid), phosphonic acid, P,P'-((2-propen-1-ylimino)bis(methylene))bis-phosphonic acid, P,P',P"-(nitrilotris(methylene))tris-(nitrilotris(methylene)) trisphosphonic acid, ((methylimino)dimethylene) bisphosphonic acid, P,P',P"',P""-(oxybis(2,1-ethanediylnitrilobis(methylene))tetrakis-((propylimino)bis (methylene))diphosphonic acid, P,P',P"-(nitrilotris (methylene))tris-(ethylenedinitrilo)-tetramethylenephosphonic acid, ethylene-bis (nitrilodimethylene)tetraphosphonic acid, (ethylenebis (nitrilobis(methylene)))tetrakisphosphonic acid, tetrasodium tetrahydrogen (ethane-1,2-diylbis(nitrilobis (methylene)))tetrakisphosphonate, 6-(bis(phosphonomethyl)amino)hexanoic acid, (phenylmethyl)imino)bis(methylene)bisphosphonic acid, phosphonobutane tricarboxylic acid, 2-hydroxyphosphono dicarboxylic acid, or a combination thereof. In some embodiments, the REA comprises PMIDA.

In some embodiments, the REA is a metallated mono- or pluri-acetoaminophosphonate comprising a cation of Li, Na, K, Cs, Mg, Ca, Sr, Ba, Cr, Fe, Mn, Co, Ni, Cu, Ti, Zn, Zr, Ga, Al, In or a combination thereof. In some embodiments, the REA is a non-metallated diacetoaminophosphonate comprising a nonmetal selected from the group consisting of hydrogen ions, ammonium ions, tetraalkylammonium ions, tetraalkylphosphonium ions, a mono-, di-, or tri-alkanolamine wherein the alkyl species of the alkanol functionality can be methyl-, ethyl-, an isomer of propyl or an isomer of butyl, a nucleophile, an electrophile, a Lewis acid, a Lewis base, a Bronsted acid, a Bronsted base, an adduct of a stable complex ion, an electron donor and combinations thereof. Furthermore, under the appropriate acid/base conditions a zwitterionic species of the REA that can form hydrogen bridges with nucleophiles, such as Lewis bases, Bronsted bases, or form adducts where an electron donor-electron acceptor pair is stable. Such species, nucleophiles or electron donor-acceptor, may comprise a monoalkanolamine, dialkanolamine or trialkanolamine for instance; where the alkyl species of the alkanol functionality can be methyl group, ethyl group, an isomer of a propyl group or a butyl group.

The REA may be present in the REFS in an amount of from about 0.1 wt. % to about 10 wt. %, alternatively from about 0.1 wt. %% to about 1 wt. %, alternatively from about 1 wt. % to about 5 wt. %, or alternatively from about 5 wt. % to about 10 wt. % based on percent by weight of solution.

A REFS of the type disclosed herein may further comprise a surfactant. In some embodiments, the surfactant comprises a fatty acid alkoxylate, an amine oxide, alkanolamide, an alkoxylated alcohol, an alkylamine alkoxylate, an alkyl glycoside surfactant, a polyethylene glycol-initiated polyol, an ethylene glycol additive, a diethanolamide of tall-oil fatty acid (TOFA), a sorbitol-initiated polyol, or a combination thereof.

In other embodiments, the surfactant comprises Guerbet alcohols. Guerbet alcohols refer to $C_8$ to $C_{25}$ β-alkylated dimer alcohol alkoxylated with ethylene oxide (EO), propylene oxide (PO), a mixture of both, or blocked to control oil/water solubility; wherein the blocked alcohol is a product of reacting a mixture of ethylene oxide and propylene oxide of varying concentrations and the product(s) is determined by entropic and electrophilic factors. Such process entails the sequential treatment of alcohols with first EO, then PO.

In other embodiments, the surfactant comprises a $C_8$ to $C_{25}$ β-alkoxylated dimer alcohol having an ethoxylate moiety and a propoxylate moiety present in ratio of from about 4:1, alternatively from about 2:1, alternatively from about 1:1, alternatively from about 1:2, or alternatively from about 1:4. In some embodiments, the $C_8$ to $C_{25}$ β-alkoxylated dimer alcohol comprises 2-butyloctanol, 2-hexyldecanol or a combination thereof.

In some embodiments, the surfactant comprises a sulfate salt-capped secondary propoxylated alcohol (extended surfactant class). Extended surfactants are a class of molecules that undergo a sulfonation reaction after an alcohol has been subjected to sequential EO, followed by PO, or visa versa additions, to attenuate the lipophilicity of the molecule. The moles of EO may range from about 0.01% to about 10%, alternatively from about 0.01% to about 0.1%, alternatively from about 0.1% to about 1.0% or alternatively from about 1.0% to about 5.0% based on the amount of alcohol and moles of PO may range from about 1.0% to about 10% based on the amount of alcohol.

The surfactant may be present in the REFS in an amount of from about 0.01% to about 2.0%, alternatively from about 0.01% to about 0.1%, alternatively from about 0.1% to about 1.0% or alternatively from about 1.0% to about 2.0% based on the total volume of the solution.

In some embodiments, the REFS comprises a miscible fluid. Any fluid miscible with the other components of the REFS and compatible with the application may be utilized. In some embodiments, the miscible fluid comprises methane, ethane, propane, butane, natural gas, carbon dioxide, nitrogen, or combinations thereof. In some embodiments, the miscible fluid is a gas which may be liquified prior to injection into the wellbore to simplify transport and delivery to location, for example liquified natural gas (LNG), compressed natural gas (CNG, or liquified $CO_2$. Herein CNG and LNG refer to a variable mixture of hydrocarbons and inert gases that can contain methane, ethane, propane, butane, traces of longer chain hydrocarbons and inert gases. It may also contain natural gas liquids of varying hydrocarbon lengths. CNG and LNG can be obtained from various sources such as nearby wells, gas plants, pipeline sources, cryogenic shipments and compressor stations. In the case of LNG, which is a true cryogenic fluid, it may be pumped through a vaporizer located downstream of the cryogenic pump to heat the fluid and turn it into a gas to avoid operational issues associated with extreme temperature changes. This gas can then be mixed with an aqueous phase to create a foamed fluid system. In some embodiments, the REFS which is a component of the foamed system is a good diverting agent helping to achieve more uniform treatment over long intervals, which would most certainly exist in horizontal well environments.

The miscible fluid may be present in the REFS in an amount of from about 10% to about 85%, alternatively from about 30% to about 85%, alternatively from about 10% to about 30%, alternatively from about 30% to about 60% or alternatively from about 60% to about 85% based on quality at down hole conditions or % gas phase at down hole conditions of temperature and pressure.

In some embodiments, the REFS comprises a base fluid comprising an aqueous fluid. The aqueous fluid may comprise fresh water, salt water, deionized water, produced water, flowback water, brackish water, brine, seawater or a combination thereof. The aqueous fluid may comprise sodium bromide, calcium chloride, calcium bromide, cesium bromide, zinc bromide, potassium chloride, sodium chloride, a carbonate salt, a sulfonate sale, sulfite salts, a phosphate salt, a phosphonate salt, a magnesium salt, a bromide salt, a formate salt, an acetate salt, thiophosphate salts, phosphate salts, phosphonate salts, a nitrate salt or a combination thereof. The aqueous fluid may be present in an amount of from about 0.01 wt. % to about 99 wt. % based on the total weight of the wellbore servicing fluid or may comprise the rest of the composition when all other components are taken into account.

Disclosed herein is a method of enhancing the rate of water imbibition into a reservoir of the type disclosed herein (e.g., ultralow permeability carbonate-containing reservoir). In some embodiments, the method comprises introducing the REFS into a wellbore and conducting a Huff and Puff operation.

Herein a Huff and Puff operation refers to a cyclic process in which a well is injected with a REFS and, after a soak period, the well is put back on production. A REFS of the type disclosed herein can be utilized in single well applications. In other embodiments, a REFS of the type disclosed herein can be utilized in a multi-well application. In such embodiments, the presently disclosed compositions and methods may result in the extraction of significantly more oil from the tight reservoir matrix in a multi-well application. In such applications the injection periods may be alternated or sequenced between multiple wellbores to take advantage of pressure communication, forced imbibition, fluid miscibility and chemical/rock interaction to effectively liberate more oil from the current injector well. These methods may also have a positive impact on adjacent wellbores and ultimately increase recovery of hydrocarbon over a multi-well field by taking advantage of well interference, pressure communication and chemical interaction to improve reservoir recovery over a significantly large area. Further, the REFS of the present disclosure may be utilized in the optimization of hydrocarbon recovery from a field or unit of wells vs. single-well drainage.

In some embodiments, a Huff and Puff operation of the type disclosed herein involves introduction of a REFS to a wellbore residing within a reservoir. Subsequent to placement of the REFS, the miscible fluid (e.g., $CO_2$) is injected into the well. During the injection stage, the injected gas remains immiscible and bypasses the oil, either by displacing moveable water or oil. Some moveable water saturation is desirable as it can prevent oil from being displaced away from the wellbore. By the end of the injection stage, the miscible fluid is dispersed throughout the reservoir and mass transfer between the miscible fluid and crude oil occurs. The reservoir pressure at the end of the injection cycle is also significantly higher than pressure at the beginning, which is an aid to miscibility although it is desired that displacement does not occur during injection.

Following injection of miscible fluid, the method further comprises a soak period where the well is shut-in. During the soak period, the mass transfer between crude oil and miscible fluid occurs. The oil phase swells in volume and intermediate hydrocarbons are extracted into the miscible fluid. In some embodiments, the soak period is dependent upon a variety of factors but may range from about 1 day to about 30 days, alternatively from about 1 day to about 5 days, alternatively from about 5 days to about 10 days or alternatively from about 10 days to about 30 days.

In some embodiments, the method further comprises a production stage. In the production stage, oil production occurs as a result of oil swelling, viscosity reduction, extraction, lower interfacial tension (IFT), and relative permeability shifts due to the displacement of the moveable water by the miscible fluid. Oil swelling occurs throughout the contacted region rather than at the flood front as in a continuous flood, and the relative permeability of the oil is increased as a result. The lower viscosity and IFT also enhances the oil migration more easily.

In some embodiments, the REFS is utilized in a Huff and Puff operation in a lower permeability carbonate reservoir. Many of these lower permeability carbonate reservoirs may include very low permeability carbonate rich shale that are either acid-stimulated or hydraulically-fractured during the initial completion to achieve better reservoir connectivity and higher early production rates. In some embodiments, the Huff and Puff operation is carried out in a lower permeability carbonate reservoir having a permeability ranging from about 0.001 md to about 10 md, alternatively from about 0.001 md to about 0.01 md, alternatively from about 0.01 md to about 0.1 md or alternatively from about 0.1 md to about 10 md. Due to the low matrix permeability, however, these wells are subject to rapid depletion under primary production conditions, meaning that the production rate will decline very fast in a relatively short period of time due to pressure depletion within the reservoir.

In some embodiments, the REFS is utilized in an EOR involving a Huff and Puff operation wherein the operation is carried out on a single well. In alternative embodiments, the REFS is utilized in an EOR involving a Huff and Puff operation wherein the operation is carried out on a multi-well platform having n wells where n ranges from about 2 to about 40, alternatively from about 2 to about 10, alternatively from about 5 to about 20 or alternatively from about 10 to about 40. In such embodiments, the injection periods are alternated or sequenced between multiple wellbores to take advantage of pressure communication, forced imbibition, fluid miscibility and chemical/rock interaction to effectively liberate more oil from the current injector well and also have a positive impact with adjacent wellbores and ultimately increase recovery of hydrocarbon over a multi-well field or unit. For example, the methods disclosed herein may result in an increase in the oil extracted from the calcite-rich reservoir of from about 1 fold to about 4 fold, alternatively from about 1.0 to 2.0 fold, alternatively from about 2.0 to about 3 fold or alternatively from about 3 to about 4 fold.

Without wishing to be limited by theory, in traditional Huff and Puff operations, production on a wellbore is initially halted and a period of fluid or blended fluid chemical system injection commences for a period of time to restore local pressure and contact as much reservoir volume as possible. During this injection period fluids that are miscible with the reservoir fluid such as carbon dioxide, methane, ethane or mixtures of these gases potentially combined with water and surfactants.

The use of high-powered pumps similar to those used for fracturing are capable of pumping at an increased rate, compared to current Huff and Puff operations, resulting in placement of a greater volume of the miscible fluid system into the reservoir in a shorter time frame (i.e. reduced injection time, increased production time). The pumping of LNG into the formation allows for the operation to eliminate the capital expenditure of compressors and pipelines for gas supply which are needed for injection of natural gas in a gaseous state.

Today many of the naturally-fractured carbonate reservoirs have been placed on water flood with reasonable success in higher matrix permeability reservoirs. In lower permeability matrix reservoirs, however, the success of water flooding has not been as successful due to the inability to displace oil from the reservoir matrix. The water essentially follows existing fractures, sweeping oil within the fracture system, but leaving oil in the matrix behind. Many of these lower permeability carbonate reservoirs, that may include very low permeability carbonate-rich shale, are now being drilled as horizontal wells that are either acid stimulated or hydraulically fractured during the initial completion to achieve better reservoir connectivity and higher early production rates. Due to the low matrix permeability, however, these wells are subject to rapid depletion under primary production conditions, meaning that the production rate will decline very fast in a relatively short period of time due to pressure depletion within the reservoir. Water injection is one way of applying pressure support, but as stated before, not very effective in low permeability fractured carbonate reservoirs. Currently many of these lower permeability reservoirs are completed with multi-well pads (e.g., having injection sequences as shown in FIGS. 1-4) to reduce surface facility costs and operating costs. These pads typically contain multiple wells that are drilled from one location with the wellheads all in close proximity to each other on surface, but through the use of directional and horizontal drilling are capable of targeting a large region within the reservoir around the pad location. Thus, wells (e.g., multi-well pads) in such lower permeability matrix reservoirs (e.g., carbonate and/or shale reservoirs) are good candidates for the Huff and Puff techniques described herein.

The REFS and methods disclosed herein represent a novel composition and application developed and tested that uses a formulation (i.e., REFS) that is capable of forming various types of emulsions upon contact with the hydrocarbon-based fluids found in conventional oil reservoirs. Further, the REFS facilitates advantageous mineral dissolution at neutral or near neutral pH inducing a favorable wettability modification of the formation surface. In some embodiments, the pH of the REFS may be from about 5 to about 9 or from about 6.5 to about 8.5. Herein the pH takes its standard definition as an indication for the acidity of a substance. The outcome of a pH-measurement is determined by a consideration between the number of H+ ions and the number of hydroxide (OH—) ions. When the number of H+ ions equals the number of OH— ions, the fluid is neutral and then has a pH of about 7. The pH of the solution may be determined using any suitable methodology such as through the use of a pH electrode or indicator media.

It is contemplated that during the injection cycle on one well, immediate offset wells may receive some pressure support and production improvement from the increase in local pressure in addition to any fluid miscibility and chemical/rock interaction. To date, however, no investigation has been done looking into the possibility of using a planned pattern of injection and production from a multiple horizontal well unit using a Huff and Puff type EOR solution of the type described herein. Accordingly, disclosed herein is a design process to determine an optimum pattern of injection and production in addition to injection fluid chemistry for Huff and Puff operations (e.g., on a multi-well pad) to take advantage of the well interference that is inherently present with such multi-well pads to not only increase production from the subject well, but to extend the benefit across a full field (e.g., one or more multi-well pads penetrating a common formation) and achieve better overall asset performance and reservoir recovery.

In one or more embodiments, a foamed REFS is employed in a hydraulic fracturing operation. Hydraulic fracturing is a process that forms fractures in a subterranean formation using a pressurized fluid. The fracturing fluid is introduced into the subterranean formation through a wellbore that has been drilled into the formation, and then pressurized to fracture the formation. Among other components, the fracturing fluid will typically contain a proppant material that enters into the newly formed fractures and prevents those fractures from closing up.

At the end of a hydraulic fracturing job, a large surface-area fracture will have been created and propped permanently open by the application of a proppant-laden, pressurized, often aqueous, hydraulic fluid. The next step in the hydraulic fracturing job is to decrease the pressure applied to the aqueous hydraulic fluid to allow the fluid sitting in the near well-bore region of the target formation between the targeted hydrocarbons and the wellbore to flow back into the well and up to the surface for treatment and disposal or re-use later.

The amount of fracturing fluid left behind in the formation will diminish to an irreducible fraction and then stop flowing back. This irreducible fraction of fracturing fluid left behind in the formation will subsequently impede the flow of hydrocarbon from the petroliferous formation into the very high permeability proppant pack.

A flowback aid may be included in the fracturing fluid to reduce capillary pressure and water blocks, thereby improving the kinetics of the flowback and preventing or minimizing the leaving-behind of any substantial amount of the fracturing fluid. Flowback aids function to aid in the "cleanup" of the proppant pack, thereby accelerating the flow of hydrocarbons through the high permeability proppant pack.

In one or more embodiments, a foamed REFS of the present disclosure is used in a gas-energized hydraulic fracturing operation to generate fractures or flow pathways. In such embodiments, a REFS of the type disclosed herein further comprises a foaming agent. Such foamed REFS may be foamed using any suitable foaming agent. In one or more embodiments, the foaming agent comprises a miscible fluid such as compressed natural gas (CNG), liquified natural gas (LNG), nitrogen, carbon dioxide or a combination thereof. Such foamed compositions can be generated using any suitable methodology. For example, the foamed REFS may be generated on the surface where the REFS is mixed with a gas (e.g., CNG) at or prior to the wellhead employing a shear rate sufficient to generate a foamed composition. In other embodiments, the foamed REFS is generated by pumping into the wellbore, in alternating fashion, the REFS and foamer (e.g., CNG) such that a foamed composition is created in situ in the wellbore.

In one or more embodiments, the foamed REFS may be placed in conventional oil-wet formations comprising calcium carbonate, aluminum silicates, sodium silicates, clayed materials, unconventional shale reservoirs or a combination thereof. The placing of the foamed REFS in the subterranean formation or the contacting of the foamed REFS with the subterranean formation and the hydraulic fracturing can occur at any time with respect to one another; for example, the hydraulic fracturing can occur at least one of before, during, and after the contacting or placing of a foamed REFS. In some embodiments, the contacting or placing of a foamed REFS occurs during the hydraulic fracturing, such as during any suitable stage of the hydraulic fracturing, such as during at least one of a pre-pad stage (e.g., during injection of water with no proppant, and additionally optionally mid- to low-strength acid), a pad stage (e.g., during injection of fluid only with no proppant, in the presence or absence of a viscosifier, such as to begin to break into an area and initiate fractures to produce sufficient penetration and width to allow proppant-laden later stages to enter), or a slurry stage of the fracturing (e.g., viscous fluid with proppant). A method of the present disclosure can include performing a stimulation treatment at least one of before, during, and after placing the foamed REFS in the subterranean formation in the fracture, flow pathway, or area surrounding the same. The stimulation treatment can be, for example, at least one of perforating, acidizing, injecting of cleaning fluids, propellant stimulation, and hydraulic fracturing. In some embodiments, the stimulation treatment at least partially generates a fracture or flow pathway where the foamed REFS is placed in or contacted to, or the foamed REFS is placed in or contacted to an area surrounding the generated fracture or flow pathway.

In some embodiments, the foamed REFS can be placed in the subterranean formation neat. The placing of the foamed REFS in the subterranean formation can be any suitable placing and can include any suitable contacting between the subterranean formation and the foamed REFS. The placing of the foamed REFS in the subterranean formation can include at least partially depositing the foamed REFS in a fracture, flow pathway, or area surrounding the same.

In some embodiments, the foamed REFS can be placed in the subterranean formation as a component of a wellbore servicing fluid. The placing of the foamed REFS in the subterranean formation can including placing the wellbore servicing fluid that includes the foamed REFS in the subterranean formation. The method can include performing a subterranean formation treatment operation in the subterranean formation, such as using a wellbore servicing fluid that includes the foamed REFS, or using a wellbore servicing fluid that is free of the foamed REFS but with placement of the foamed REFS in the subterranean formation before or after placing the wellbore servicing fluid in the subterranean formation. The wellbore servicing fluid can be a hydraulic fracturing fluid. The method can include hydraulically fracturing the subterranean formation with the foamed REFS (e.g., which can be injected adjacent to a hydraulic fracturing fluid) or with a hydraulic fracturing fluid including the foamed REFS. In embodiments, the foamed REFS may function as a flowback aid.

EXAMPLES

The presently disclosed subject matter having been generally described, the following examples are given as particular embodiments of the subject matter and to demonstrate the practice and advantages thereof. It is understood that the examples are given by way of illustration and are not intended to limit the specification or the claims in any manner.

Example 1

A series of newly designed tests were developed and run to evaluate the effectiveness of cyclic injection of different fluid/gas systems and the reservoir fluid recovered from oil saturated, very low permeability core for each system. The Minimum Miscibility Pressure (MMP) was also measured for the different fluid/gas systems that were evaluated during this work to help understand the importance of miscibility with the reservoir oil. Table 1 provides a summary of gas systems evaluated and the associated MMP.

TABLE 1

| Fluid/gas | Temp (° F.) | Oil | MMP (psi) |
|---|---|---|---|
| $CO_2$ | 155 | WCA | 2061 |
| $CH_4$ | 155 | WCA | 5715 |
| 85% $CH_4$, 15% $C_2H_6$ | 155 | WCA | 4452 |
| 50% $CH_4$, 50% $C_2H_6$ | 155 | WCA | 2853 |

A new core testing procedure was created that would mimic a high permeability fracture in contact with a tight reservoir matrix. This was accomplished by placing the oil saturated, low permeability core into an aluminum core holder and surrounding it with 1 mm diameter glass beads, to create a high permeability channel on all sides of the core. The aluminum core holder enabled time lapse computed tomography (CT) scanning of the core to measure the density changes of the fluid in the core during the test to create visualizations of how the injected fluid/gas system interacted with the core. The injection process was completed as follows: (i) pull a vacuum on the core assembly; (ii) inject the desired fluid/gas treatment fluid and pressurize the cell to the desired pressure target; (iii) allow the system to soak for 72 hours taking periodic CT scans of the care; and (iv) displace the initial fluid/gas treatment fluid while collecting all effluent to analyze the amount of crude oil recovered from the core sample.

The results of these tests are listed in Table 2 for multiple different fluid/gas system. Surfactant 1 and Surfactant 2, indicated in Table 2, are blends of surfactants that were developed to alter wettability and form foams with a hydrocarbon gas phase.

TABLE 2

| Gas/fluid system | Pressure (psi) | Temp (° F.) | Recovery Factor (%) |
|---|---|---|---|
| Brine | 5000 | 155 | 6.86 |
| Brine + Surfactant 1 | 5000 | 155 | 12.28 |
| Brine + Surfactant 2 | 5000 | 155 | 14.39 |
| $CH_4$ | 5000 | 155 | 9.7 |
| 85% $CH_4$, 15% $C_2H_6$ | 5000 | 155 | 13.0 |
| 50% $CH_4$, 50% $C_2H_6$ | 5000 | 155 | 23.0 |
| $CO_2$ | 5000 | 155 | 8.7 |
| Brine + Surfactant 1 (70 Q foam with 85% $CH_4$, 15% $C_2H_6$) | 5000 | 155 | 12.8* |
| Brine + Surfactant 1 (70 Q foam with 50% $CH_4$, 50% $C_2H_6$) | 5000 | 155 | 19.2 |

*Significant amount of oil observed trapped in the core holder after the test.

While all of the core plugs used for these tests were taken from the same parent core within a sample of approximately 1 ft in length, significant heterogeneity was still observed within the CT Scans. The carbon dioxide test appeared to be the most severely impacted with a significant feature observed in the core plug with the CT Scans. A significant amount of oil was trapped within the glass beads in the core holder for the brine surfactant foam test using 85% methane and 15% ethane. Finally, the behavior of the final test with foamed brine with 50% methane 50% ethane showed a much faster recovery of the oil than the test with just the 50% methane and 50% ethane, although the latter produced slightly more fluid.

Example 2

Use of a REFS of the type disclosed herein in various multi-well configurations were schematized. FIGS. 1 through 4 demonstrate how use of Huff and Puff operations on a multi-well (e.g., 5-well) pad could achieve improved recovery in a horizontal fractured well environment. For reference, the individual wells are referred to by numbers 1-5 from left to right. These fracture systems can include natural fractures, hydraulic fractures or a combination of both. It should be noted, while the figures clearly state that the reservoir was not swept utilizing this process, any residual oil with in a fracture system that connects 2 wellbores may be swept to a producing wellbore during this process. This process is capable of energizing and/or sweeping oil stranded within a fracture system as well as energizing and mobilizing fluids from pore spaces within the rock matrix itself.

FIG. 1 illustrates Huff and Puff using a REFS to enhance production in multi-well and single well applications. For example, a same or different REFS can be injected, sequentially or simultaneously, into either or both of wells 2 and 4 as shown in FIG. 1. Hydraulic communication between fractured wells will enable offset wells to be positively impacted. The specific conditions for this application include without limitation hydraulically fractured wells, natural fractures, miscible injection fluids, reactive treatment fluids, imbibition and hydrocarbon displacement and/or high energy expansion of the REFS.

Figure 2:
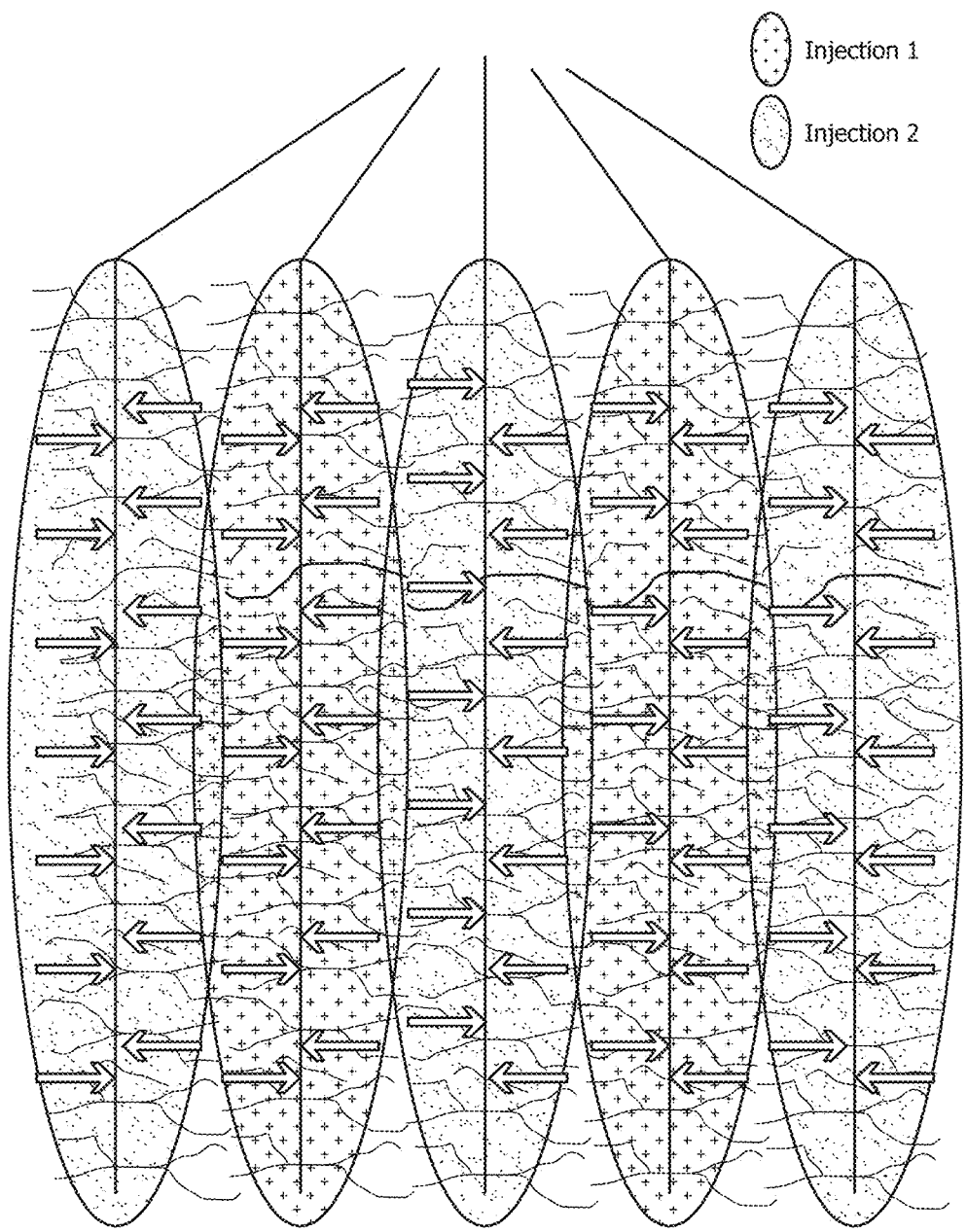
FIG. 2 depicts a scenario wherein injection is complete in the initial 2 wellbores and the injection starts in the 3 offset wells effectively impacting the reservoir pressure over a much larger area encompassing all 5 wells.
Figure 3:
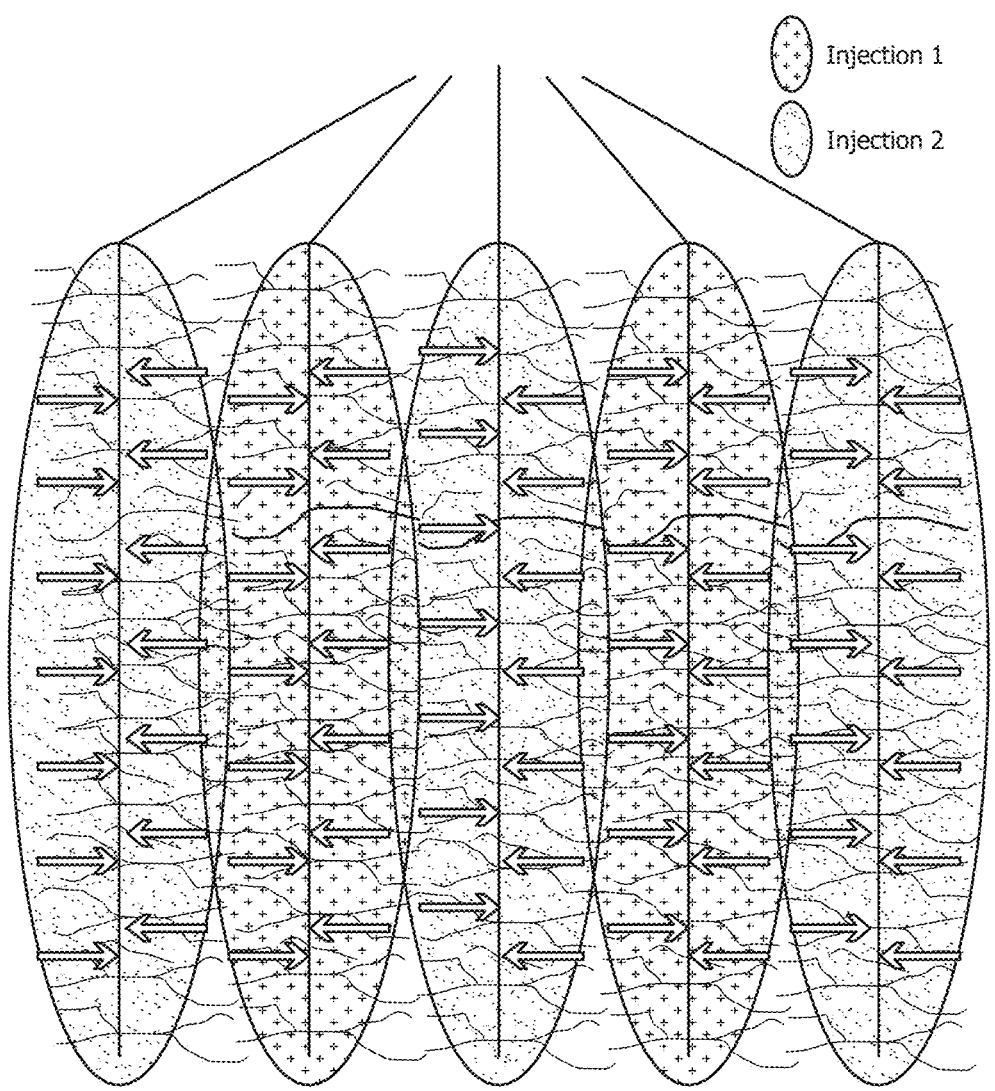
FIG. 3 depicts a scenario wherein injection is occurring in only a portion of each well in a pattern that will provide the maximum amount of pressure distribution over the 5 well pad and enhance flow.

FIG. 2 illustrates a 5-well pad configuration where injection of a REFS occurred into 2 wells in order to pressure the other 3 wells. For example, a same or different REFS can be injected, sequentially or simultaneously, into both of wells 2 and 4 as shown in FIG. 2. Optionally, a same or different REFS can be injected, sequentially or simultaneously, into any combination of wells 1, 3, and 5 as shown in FIG. 2. The pressurized region created around the injection wells are expected to energize the region with pressure to enable enhanced production from that well after the injection. Through the fracture system, pressure communication with offset production wells will also enable production enhancement by pressurizing the fracture system. The present disclosure contemplates injection wells can be alternated to provide more complete and uniform drainage. Alternatively, in a 5-well pad configuration where injection of a REFS occurred into 2 wells in order to pressure the other 3 wells (a) a same or different REFS can be injected, sequentially or simultaneously, into either or both of wells 2 and 4 in a first stage and (b) then a same or different REFS can be injected, sequentially or simultaneously, into any combination of wells 1, 3, and 5 in a second stage. The illustrated application contemplates re-energizing pressure depleted fluids, exposing new hydrocarbon and the use of hydraulic communication to contact a very large surface area of the formation FIG. 3 illustrates a 5-well pad configuration where injection of a REFS of the type disclosed herein is injected in a first portion of the well and production occurs in in different portions in each well and wherein the process excludes a reservoir sweep. For example, (a) a same or different REFS can be injected, sequentially or simultaneously, into either or both of wells 2 and 4 corresponding to a first region (e.g., upper depth) of the wellbore in a first stage and (b) then a same or different REFS can be injected, sequentially or simultaneously, into any combination of wells 1, 3, and 5 corresponding to a second region (e.g., lower depth) of the wellbore in a second stage, as shown in FIG. 3. The illustrated application contemplates re-energizing pressure depleted fluids, exposing new hydrocarbon, the use hydraulic communication to contact a very large surface area of the formation, multiple injection and production cycles, multiple well and multiple well portions.

Figure 4:
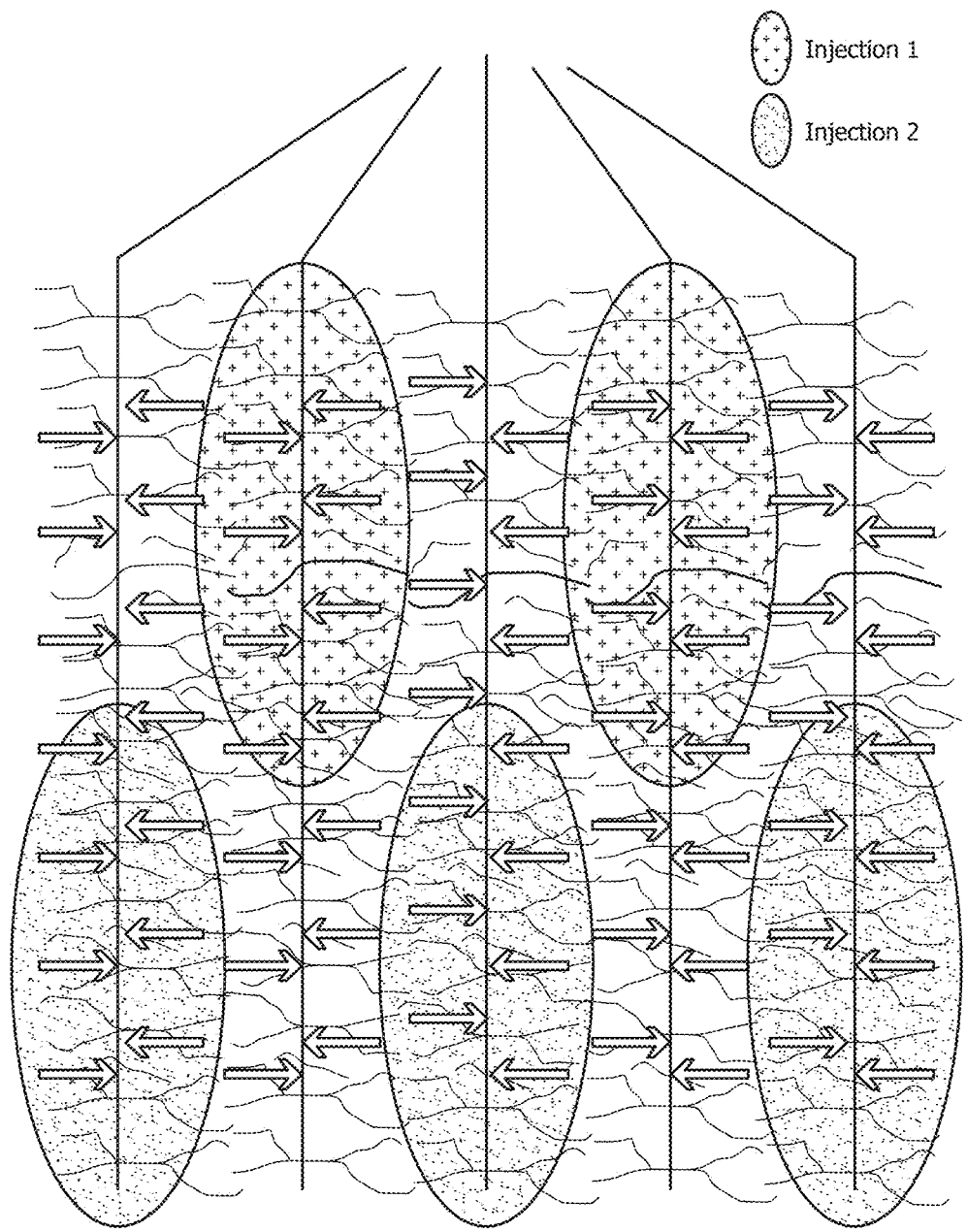
FIG. 4 is a schematic of a 5 well pad EOR process involving injection of a REFS of the present disclosure and production in different portions in each well.

FIG. 4 illustrates a 5 well pad configuration where injection of a REFS of the type disclosed herein is injected in a first portion of the well and production occurs in in different portions in each well and wherein the process excludes a reservoir sweep. The illustrated application contemplates re-energizing pressure depleted fluids, exposing new hydrocarbon, the use hydraulic communication to contact a very large surface area of the formation, multiple injection and production cycles, multiple well and multiple well portions Example 3

The extent to which REFS of the type disclosed herein can displace oil from reservoir core samples was investigated. An REA of the disclosure is designated in the accompanying tables and figures as MPMID (e.g., metallated PMIDA) and a REFS of the disclosure is a combination of a microemulsion (e.g., ME-1) and an MPMID. The components of microemulsion samples designated ME-1, ME-11 and ME-12 are presented in Table 3. STEPASOL® MET-10U, AMMONYX® LMDO, and BIOSOFT® N-300 are surfactants commercially available from Stepan Company.

TERGINOL® 15-5-15 AND TERGINOL® 5-5-9 are surfactants commercially available from Granger Co. ETHOMEEN® T/25 AND ELEVANCE® CLEAN 1000 are surfactants commercially available from Nouryon and Elevance Renewable Sciences, respectively. RHODA-SOLV® IRIS is a nontoxic solvent commercially available from Solvay. CLEARBREAK® 8967, and CLEAR-BREAK® DA-32 are deemulsifiers commercially available form Solvay. NOVEL® 23e7 and KB3341 are surfactants commercially available from Sasol.

Figure 5:
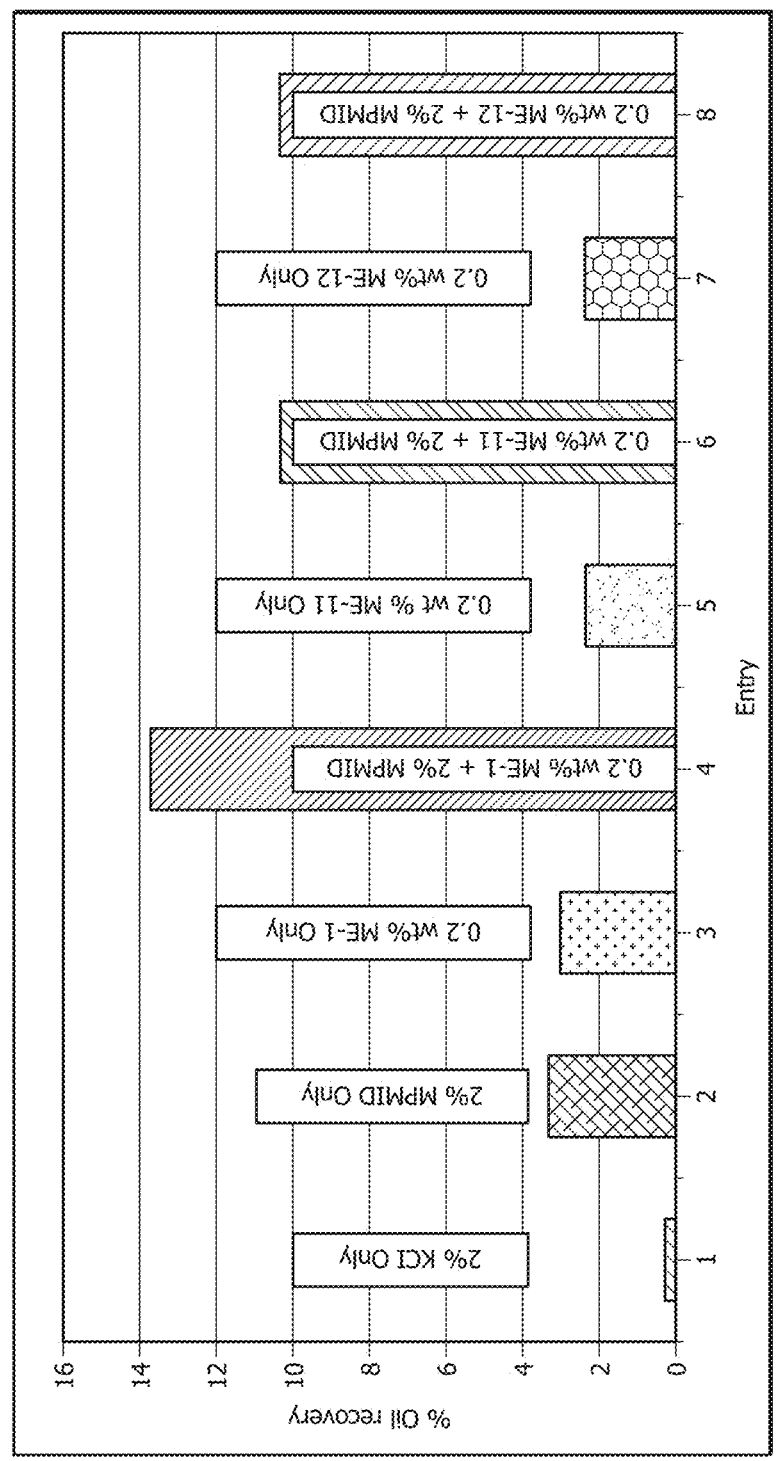
FIG. 5 is a plot of oil recovery as a function of REA content.

Oil-wet Texas Cream and Brethiemer Sandstone cores were prepared by first vacuum saturating the outcrop cores with Niobara crude oil (API 45) followed by aging the saturated cores at an elevated temperature (195° F.) for a set time period. Texas Cream outcrop cores comprising greater than about 99.5% calcium carbonate were saturated with Niobrara crude oil and then contacted with a brine, a microemulsion or a REFS of the type disclosed herein (i.e., microemulsion and REA in a brine). The results are presented in FIG. 5. The results demonstrate (i) the compatibility of a REA with a variety of microemulsion formulations and (ii) the ability of a REFS of the present disclosure to improve oil recovery.

Example 5

Figure 8:
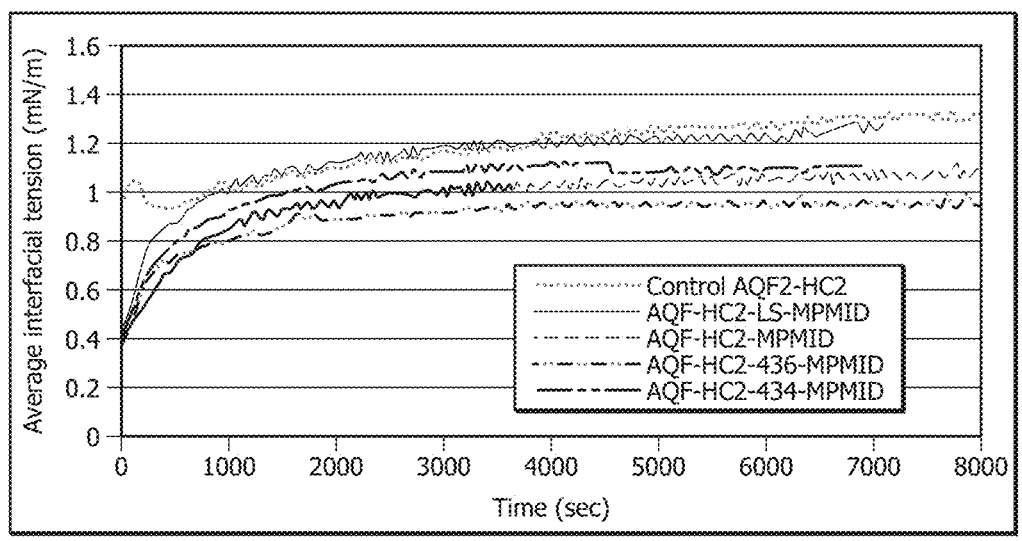
FIG. 8 is a plot of interfacial tension as a function of time for foamed breaker solutions.

Interfacial tension experiments were performed on various foam formulations containing MPMID. Crude oil from the Permian Basin Primexx Lujan 1822 with an API gravity of 41.6 was used to carry out these experiments. All experiments were performed at temperatures less than 65° C. with 5000 rad/sec. The formulations were prepared using only deionized water as a base fluid and 3 gpt of the foam formulation comprising 34% hydrocarbon 2 (HC-2), 52% aqueous fluid (AQF-2) and 14% deemulsifier. The results are presented in FIG. 8. The control sample without MPMID (i.e., only foamer) had a high interfacial tension value. The addition of MPMID to the mixture lowered the interfacial tension by 0.02 mN/m. This reduction in interfacial tension can positively affect the imbibition process during recovery and significantly improve oil displacement. The results also demonstrate that the presence of a deemulsifier in the formulation has an advantage over a surfactant in the reduction of interfacial tension but there was no significant differentiation between having the deemulsifier in the formulation and not including it. The results further demon-

TABLE 3

| | ME-1 | | ME-11 | | ME-12 | |
| --- | --- | --- | --- | --- | --- | --- |
| | Additive | Volume Percent | Additive | Volume % | Additive | Volume % |
| Aqueous Phase | Deionized Water | 20 | Deionized Water | 20 | Deionized Water | 20 |
| Oil Phase | STEPASOL® MET-10U | 20 | ELEVANCE® CLEAN 1000 | 20 | RHODASOLV® IRIS | 20 |
| Co-Solvent | Isopropanol | 30 | Isopropanol | 30 | Ethanol | 30 |
| Surfactants | TERGINOL®-15-5-15 | 10 | TERGINOL®-15-5-9 | 5 | NOVEL® 23e7 | 5 |
| | AMMONYX® LMDO | 10 | AMADOL® 511 | 5 | AMADOL® 513 | 5 |
| | ETHOMEEN® T/25 | 10 | BIO-SOFT® N-300 | 5 | KB 3341 | 5 |
| | | | CLEARBREAK® 8967 | 15 | CLEARBREAK® SA-32 | 15 |

Figure 6:
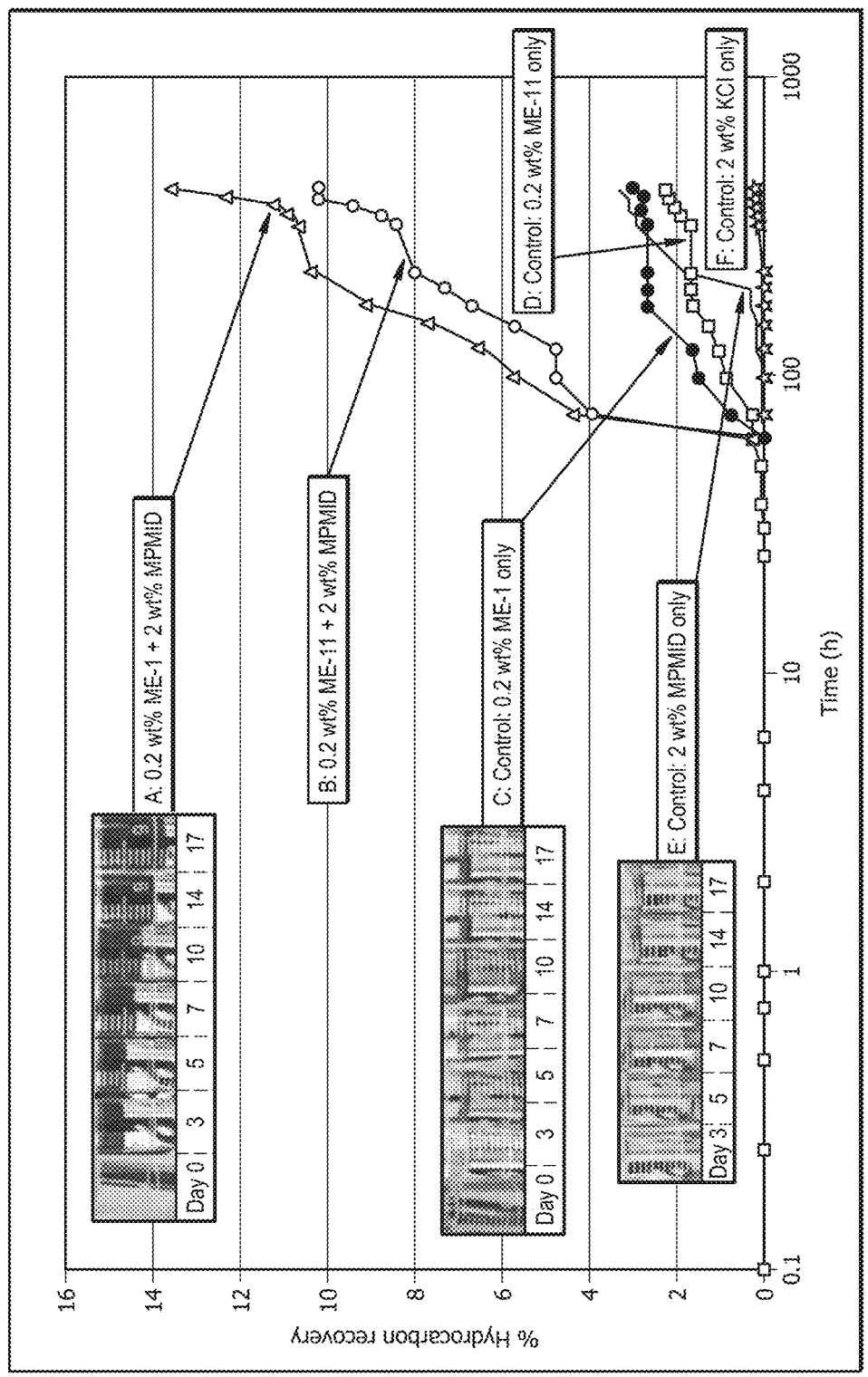
FIG. 6 is a plot of the percent hydrocarbon recovery as a function of time for various breaker solutions.

A plot of percent hydrocarbon recovery as a function of time, FIG. 6, demonstrated the inability of 2% KCl brine to displace oil from the core samples indicating the Texas Cream core samples saturated with Niobara oil were oil-wet. Thus, both the 0.2 wt. % ME-1 and 2 wt. % MPMID brines appear to sufficiently modify the wettability of the calcite surface of the core samples which resulted in the displacement of hydrocarbon, albeit at a much slower rate and much lower overall production with respect to the combination of the material in the single brine.

Example 4

Figure 7:
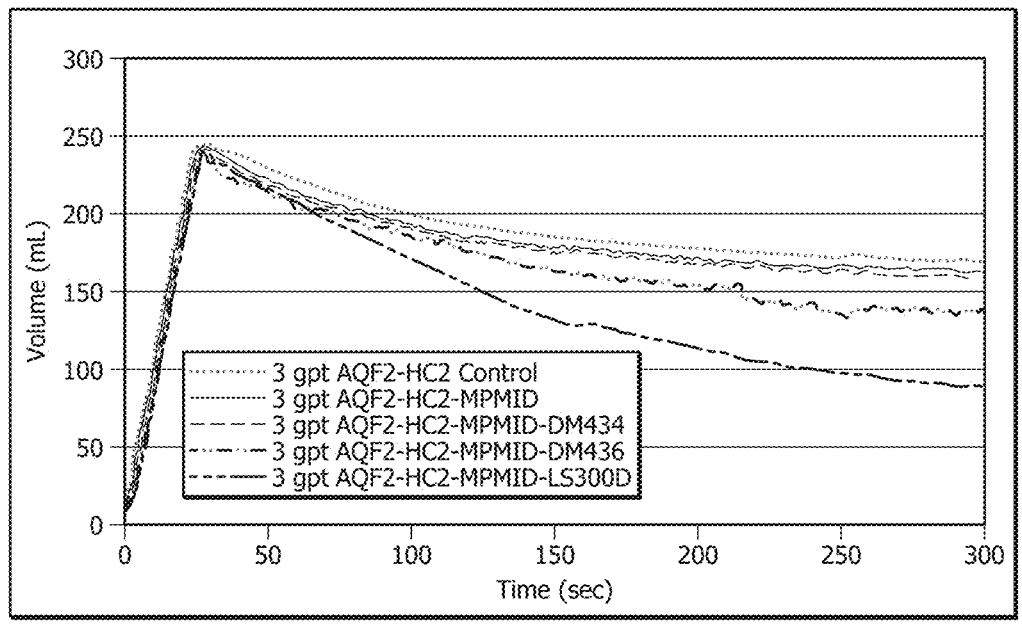
FIG. 7 is a plot of foam volume as a function of time for foamed breaker solutions.

The stability of multiple foamed REFS samples was investigated. Five samples were run under conditions of 70% volume methane gas, 30% volume aqueous solution, and 3 gpt foamer solution at 55° C. With reference to FIG. 7, a control sample containing only foamer had a maximum foam volume of approximately 240 mL and a final foam volume of 169 mL. Notably, the addition of a REA (e.g., MPMID) while reducing the final volume of the foamed material to 161 mL, this did not impact the performance of the composition. When surfactants were added to the sample, no performance loss was observed. The rate of degradation of the foams was similar until approximately 150 seconds.

strate that the addition of a REA of the present disclosure (e.g., MPMID) was sufficient to reduce the interfacial tension.

Additional Disclosure—Part I

The following are non-limiting, specific embodiments in accordance and with the present disclosure:

A first embodiment which is a method of producing natural resources from a wellbore penetrating a subterranean formation with a Huff and Puff process comprising (a) placing a recovery enhancing fluid system into the wellbore during a huff period wherein placing the recovery enhancing composition comprises injecting under pressure; (b) ceasing injection of the recovery enhancing fluid system and allowing the composition to soak in the subterranean formation for a soak period; (c) producing fluids from the subterranean formation during a puff period; and (d) optionally repeating steps (a) to (c) for a plurality of huff, soak, and puff periods, respectively.

A second embodiment which is the method of the first embodiment wherein the wellbore comprises a single well and wherein the single well is not in fluid communication with another wellbore penetrating a subterranean formation.

A third embodiment which is the method of any of the first through second embodiments wherein the wellbore is in fluid is in fluid communication with a plurality of wellbores penetrating a subterranean formation, for example the wellbore is part of a multi-well pad (e.g., a pad of multiple fractured horizontal or deviated wells penetrating a shale formation).

A fourth embodiment which is the method of the third embodiment wherein injection occurs in more than one of the wellbores penetrating the subterranean formation (e.g., injection in a first plurality of wellbores) and production occurs in greater than one and less than all of the wellbores penetrating the subterranean formation (e.g., production in a second plurality of wellbores).

A fifth embodiment which is the method of the fourth embodiment wherein (a) a first recovery enhancing fluid is injected into the first plurality of wellbores and a second recovery enhancing fluid is injected into the second plurality of wellbores wherein the first and second recovery enhancing fluids may be the same or different; (b) in step (a), the first recovery enhancing fluid is injected into the first plurality of wellbores simultaneously or sequentially; (c) in step (a) or (b), the second recovery enhancing fluid is injected into the second plurality of wellbores simultaneously or sequentially; (d) in any of steps (a)-(c), the first recovery enhancing fluid is injected into the first plurality of wellbores as the same or different depths; (e) in any of steps (a)-(d), the second recovery enhancing fluid is injected into the second plurality of wellbores as the same or different depths; or (f) any combination of (a) to (e).

A sixth embodiment which is the method of any of the first through fifth embodiments excluding a reservoir sweep.

A seventh embodiment which is the method of any of the first through sixth embodiments wherein the injection pressure exceeds a facture pressure of the subterranean formation.

An eighth embodiment which is the method of any of the first through seventh embodiments wherein the subterranean formation comprises an ultra-low permeability shale, for example a shale comprising carbonate or a carbonate rich shale.

A ninth embodiment which is the method of any of the first through eighth embodiments wherein the ultra-low permeability shale has been hydraulically fractured during completion.

A tenth embodiment which is the method of any of the first through ninth embodiments wherein the subterranean formation comprises a fractured carbonate reservoir, a sandstone reservoir, an unconventional reservoir or any combination thereof.

An eleventh embodiment which is the method of any of the first through tenth embodiments wherein the recovery enhancing fluid system comprises (i) a recovery enhancing agent comprising a phosphonoalkyl moiety; (ii) a surfactant composition; (iii) a miscible gas and (iv) a base fluid.

A twelfth embodiment which is the method of any of the first through eleventh embodiments wherein the recovery enhancing agent comprising a phosphonoalkyl moiety has the general formula

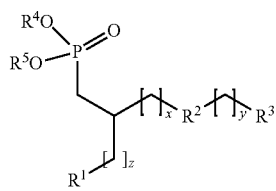

where $R^1$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonate, or a hydrogen atom; $R^2$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, a phosphonoalkylamine, or a hydrogen atom; $R^3$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonoalkyl/amine, or a hydrogen atom; $R^4$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a beryllium atom, a magnesium atom, a calcium atom, a strontium atom, a barium atom, a chromium atom, an iron atom, a manganese atom, a cobalt atom, a nickel atom, a copper atom, a gallium atom, an indium atom, or a hydrogen atom; $R^5$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a beryllium atom, a magnesium atom, a calcium atom, a strontium atom, a barium atom, a chromium atom, an iron atom, a manganese atom a cobalt atom, a nickel atom, a copper atom, a titanium atom, a zirconium atom, a gallium atom, an indium atom, or a hydrogen atom; x is 1 to 6; y is 0 to 6; and z is 1-6.

A thirteenth embodiment which is the method of any of the first through twelfth embodiments wherein the recovery enhancing agent comprising a phosphonoalkyl moiety is characterized by the Structure

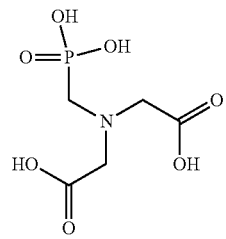 [SMILES: O=C(O)CN(CC(=O)O)CP(=O)(O)O]

A fourteenth embodiment which is the method of any of the first through thirteenth embodiments wherein the recovery enhancing agent comprises N-(phosphonomethyl) iminodiacetic acid (PMIDA) or salts thereof, N-(carboxymethyl)-N-(phosphonomethyl)glycine, glycine, N,N'-1,2-ethanediylbis(N-(phosphonomethyl), glyphosine, aminotrimethylene phosphonic acid, sodium aminotris(m-ethylenephosphonate), N-(2-hydroxyethyl)iminobis (methylphosphonic acid), phosphonic acid, P,P'-((2-propen-1-ylimino)bis(methylene))bis-phosphonic acid, P,P',P''-(nitrilotris(methylene))tris-(nitrilotris(methylene)) trisphosphonic acid, ((methylimino)dimethylene) bisphosphonic acid, P,P',P'',P'''-(oxybis(2,1-ethanediylnitrilobis-(methylene))tetrakis-((propylimino)bis (methylene))diphosphonic acid, P,P',P''-(nitrilotris (methylene))tris-(ethylenedinitrilo)-tetramethylenephosphonic acid, ethylene-bis (nitrilodimethylene)tetraphosphonic acid, (ethylenebis (nitrilobis(methylene)))tetrakisphosphonic acid, tetrasodium tetrahydrogen (ethane-1,2-diylbis(nitrilobis (methylene)))tetrakisphosphonate, 6-(bis(phosphonomethyl)amino)hexanoic acid, (phenylmethyl)imino)bis(methylene)bisphosphonic acid, phosphonobutane tricarboxylic acid, 2-hydroxyphosphono dicarboxylic acid, or a combination thereof.

A fifteenth embodiment which is the method of any of the first through fourteenth embodiments wherein the base fluid comprises an aqueous fluid.

A sixteenth embodiment which is the method of the fifteenth embodiment wherein the aqueous fluid comprises fresh water, salt water, deionized water, produced water, flowback water, brackish water, brine, seawater or a combination thereof.

A seventeenth embodiment which is the method of any of the fifteenth through sixteenth embodiments wherein the aqueous fluid comprises sodium bromide, calcium chloride, calcium bromide, cesium bromide, zinc bromide, potassium chloride, sodium chloride, a carbonate salt, a sulfonate sale, sulfite salts, a phosphate salt, a phosphonate salt, a magnesium salt, a bromide salt, a formate salt, an acetate salt, thiophosphate salts, phosphate salts, phosphonate salts, a nitrate salt or a combination thereof.

An eighteenth embodiment which is the method of any of the fifteenth through seventeenth embodiments wherein the base fluid has a total dissolved solids (TDS) content of equal to or less than about 250,000 mg/L.

A nineteenth embodiment which is the method of any of fifteenth through eighteenth embodiments wherein the aqueous fluid is present in an amount of from about 0.01 wt. % to about 99 wt. % based on the total weight of the recovery enhancing fluid system.

A twentieth embodiment which is the method of any of the first through nineteenth embodiments wherein the base fluid comprises the rest of the recovery enhancing fluid system when all other components are taken into account.

A twenty-first embodiment which is the method of any of the first through twentieth embodiments wherein the recovery enhancing agent comprising a phosphonoalkyl moiety further comprises a countercation.

A twenty-second embodiment which is the method of any of the first through twenty-first embodiments wherein the countercation comprises a metal selected from the group consisting of lithium, sodium, potassium, rubidium, cesium, beryllium, magnesium, calcium, strontium, barium, chromium, iron, manganese, cobalt, nickel, copper, gallium, indium, aluminum and a combination thereof.

A twenty-third embodiment which is the method of the twenty-first embodiment wherein the countercation comprises a nonmetal selected from the group consisting of hydrogen ions, ammonium ions, tetraalkylammonium ions, tetraalkylphosphonium ions and a combination thereof.

A twenty-fourth embodiment which is the method of the twenty-third embodiment wherein the surfactant composition comprises a sulfate-capped primary branched or secondary propoxylated alcohol, a polyethylene glycol-initiated polyol, an ethylene glycol derivative or a combination thereof.

A twenty-fifth embodiment which is the method of any of the first through twenty-fourth embodiments wherein the surfactant composition comprises a diethanolamide of a tall oil fatty acid, a sorbitol-initiated polyol or combinations thereof.

A twenty-sixth embodiment which is the method of any of the first through twenty-fourth embodiments wherein the surfactant composition comprises a $C_8$ to $C_{25}$ β-alkoxylated dimer alcohol.

A twenty-seventh embodiment which is the method of the twenty-sixth embodiment wherein the $C_8$ to $C_{25}$ β-alkoxylated dimer alcohol comprises an ethoxylate moiety, a propoxylate moiety or a combination thereof.

A twenty-eighth embodiment which is the method of any of the twenty-sixth through twenty-seventh embodiments wherein an amount of $C_8$ to C25 β-alkoxylated dimer alcohol is adjusted to control a hydrophobicity of the recovery enhancing fluid system.

A twenty-ninth embodiment which is the method of any of the twenty-sixth through twenty-eighth embodiments wherein the $C_8$ to $C_{25}$ β-alkoxylated dimer alcohol has an ethoxylate moiety present in an amount of from about 10 mole percent (mol. %) to about 90 mol % based on the total moles of the $C_8$ to $C_{25}$ β-alkoxylated dimer.

A thirtieth embodiment which is the method of any of the twenty-sixth through twenty-ninth embodiments wherein the $C_8$ to $C_{25}$ β-alkoxylated dimer alcohol has a propoxylate moiety present in an amount of from about 10 mole percent (mol. %) to about 90 mol % based on the total moles of the $C_8$ to $C_{25}$ β-alkoxylated dimer.

A thirty-first embodiment which is the method of any of the twenty-sixth through thirtieth embodiments wherein the $C_8$ to $C_{25}$ β-alkoxylated dimer alcohol has an ethoxylate moiety and a propoxylate moiety present in ratio of from about 4:1, alternatively from about 2:1, alternatively from about 1:1, alternatively from about 1:2 or alternatively from about 1:4.

A thirty-second embodiment which is the method of any the twenty-sixth through thirty-first embodiments wherein the $C_8$ to $C_{25}$ β-alkoxylated dimer alcohol comprises 2-butyloctanol, 2-hexyldecanol or a combination thereof.

A thirty-third embodiment which is the method of any of the first through twenty-fourth embodiments wherein the surfactant composition comprises an alkyl-branched alcohol, a linear alcohol or a combination thereof.

A thirty-fourth embodiment which is the method of the thirty-third embodiment wherein the alkyl-branched alcohol comprises an ethoxylate moiety, a propoxylate moiety or a combination thereof.

A thirty-fifth embodiment which is the method of the thirty-third embodiment wherein the linear alcohol comprises an ethoxylate moiety, a propoxylate moiety or a combination thereof.

A thirty-sixth embodiment which is the method of the thirty-third embodiment wherein the methyl-branched alcohol has an ethoxylate moiety and a propoxylate moiety present in a ratio of from about 4:1, alternatively from about 2:1, alternatively from about 1:1, alternatively from about 1:2 or alternatively from about 1:4.

A thirty-seventh embodiment which is the method of the thirty-third embodiment wherein the linear alcohol has an ethoxylate moiety and a propoxylate moiety present in a ratio of from about 4:1, alternatively from about 2:1, alternatively from about 1:1, alternatively from about 1:2 or alternatively from about 1:4.

A thirty-eighth embodiment which is the method of any of the first through twenty-fourth embodiments wherein the surfactant composition comprises a $C_{12}$-$C_{15}$ alkoxylated alcohol having about 9 moles of ethoxylate, an ethoxylated $C_{12}$-$C_{15}$ alcohol, a propoxylated $C_{12}$-$C_{15}$ alcohol, a combination of an ethoxylated $C_{12}$-$C_{15}$ alcohol and a propoxylated $C_{12}$-$C_{15}$ alcohol, a sorbitol-initiated polyol, a phenol formaldehyde resin with about 10 mol. % of ethoxylation or a combination thereof.

A thirty-ninth embodiment which is the method of any of the first through twenty-fourth embodiments wherein the surfactant composition comprises a triethanolamine salt of dodecylbenzene sulfate, a monoisopropyl amine salt of dodecylbenzene sulfonate; a $C_{12}$-$C_{15}$ alkoxylated alcohol having about 9 moles of ethoxylate, a propoxylated $C_{12}$-$C_{15}$ alcohol, a combination of an ethoxylated $C_{12}$-$C_{15}$ alcohol and a propoxylated $C_{12}$-$C_{15}$ alcohol or a combination thereof.

A fortieth embodiment which is the method of any of the first through twenty-fourth embodiments wherein the surfactant composition comprises a fatty acid alkoxylate, an amine oxide, alkanolamide, an alkoxylated alcohol, an alkylamine alkoxylate, an alkyl glycoside surfactant or a combination thereof.

A forty-first embodiment which is the method of any of the first through fortieth embodiments wherein the miscible gas comprises methane, ethane, natural gas, carbon dioxide, propane, butane or combinations thereof and wherein the gas is optionally liquified prior to injection thereof as part of an EOR operation.

A forty-second embodiment which is the method of any of the first through forty-first embodiments wherein the recovery enhancing fluid system has a pH of from about 5 to about 9.

A forty-third embodiment which is a method for improved hydrocarbon recovery, comprising injecting a recovery enhancing fluid system through an injection well into a hydrocarbon reservoir, and producing hydrocarbons from a resource reservoir via the injection well or a production well offset from the injection well wherein the recovery enhancing fluid system comprises a recovery enhancing agent comprising a phosphonoalkyl moiety.

A forty-fourth embodiment which is a method of the forty-third embodiment wherein injecting and producing are performed as part of a Huff and Puff operation wherein a soak period occurs between the conclusion of injecting and the start of producing.

Additional Disclosure—Part II

The following are non-limiting, specific embodiments in accordance and with the present disclosure:

A first embodiment which is a method of producing natural resources from a wellbore penetrating a subterranean formation with a Huff and Puff process comprising (a) placing a recovery enhancing fluid system into the wellbore during an injection (Huff) period of time wherein placing the recovery enhancing fluid system comprises injecting under pressure; (b) ceasing injection of the recovery enhancing fluid system and allowing the composition to soak in the subterranean formation for a soak period of time; (c) producing fluids from the subterranean formation during a production (Puff) period of time; and (d) optionally repeating steps (a) to (c) for a plurality of Huff, soak, and Puff periods of time, respectively.

A second embodiment which is the method of the first embodiment wherein the wellbore comprises a single well and wherein the single well is not in fluid communication with another wellbore penetrating a subterranean formation.

A third embodiment which is the method of any of the first through second embodiments wherein the wellbore is in fluid communication with a plurality of wellbores penetrating a subterranean formation.

A fourth embodiment which is the method of any of the first through third embodiments wherein the recovery enhancing fluid system comprises (i) a recovery enhancing agent (REA) comprising a phosphonoalkyl moiety, (ii) a surfactant, (iii) a miscible fluid and (iv) a base fluid.

A fifth embodiment which is the method of the fourth embodiment wherein the recovery enhancing agent comprising a phosphonoalkyl moiety has the general formula

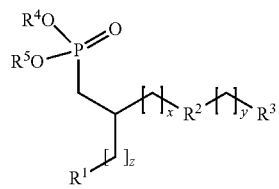

where $R^1$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonate, or a hydrogen atom; $R^2$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, a phosphonoalkyl/amine, or a hydrogen atom; $R^3$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonoalkyl/amine, or a hydrogen atom; $R^4$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a beryllium atom, a magnesium atom, a calcium atom, a strontium atom, a barium atom, a chromium atom, an iron atom, a manganese atom, a cobalt atom, a nickel atom, a copper atom, a gallium atom, an indium atom, or a hydrogen atom; $R^5$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a beryllium atom, a magnesium atom, a calcium atom, a strontium atom, a barium atom, a chromium atom, an iron atom, a manganese atom a cobalt atom, a nickel atom, a copper atom, a titanium atom, a gallium atom, a zirconium atom, an indium atom, or a hydrogen atom; x is 1 to 6; y is 0 to 6, and z is 1-6.

A sixth embodiment which is the method of the fourth embodiment wherein the REA is present in an amount of from about 0.1 wt. % to about 10 wt. %.

A seventh embodiment which is the method of the fourth embodiment wherein the base fluid comprises an aqueous fluid.

An eighth embodiment which is the method of the fourth embodiment wherein the surfactant comprises a sulfate-capped primary branched or secondary propoxylated alcohol, a polyethylene glycol-initiated polyol, an ethylene glycol derivative or a combination thereof.

A ninth embodiment which is the method of the fourth embodiment wherein the surfactant composition comprises a diethanolamide of a tall oil fatty acid, a sorbitol-initiated polyol or a combination thereof.

A tenth embodiment which is the method of the fourth embodiment wherein the surfactant is present in an amount of from about 0.01 wt. % to about 2.0 wt. %.

An eleventh embodiment which is the method of the fourth embodiment wherein the miscible fluid comprises methane, ethane, natural gas, carbon dioxide, propane, butane or a combination thereof.

A twelfth embodiment which is the method of the fourth embodiment wherein the miscible fluid is present in an amount of from about 10 wt. % to about 85 wt. %.

A thirteenth embodiment which is a method of enhanced oil recovery comprising (a) injecting in subterranean formation during a Huff period of time a first recovery enhancing fluid system into a first plurality of wellbores and injecting a second recovery enhancing fluid system into a second plurality of wellbores wherein the first and second recovery enhancing fluid systems may be the same or different; (b) ceasing injection of the recovery enhancing fluid system and allowing the composition to soak in the subterranean formation for a soak period of time; (c) producing fluids from the subterranean formation during a Huff period of time; (d) optionally repeating steps (a) to (c) for a plurality of Huff, soak, and Puff periods of time, respectively.

A fourteenth embodiment which is the method of the thirteenth embodiment wherein the soak period ranges from about 1 day to about 30 days.

A fifteenth embodiment which is the method of the thirteenth embodiment wherein the subterranean formation comprises a single wellbore.

A sixteenth embodiment which is the method of the thirteenth embodiment wherein the subterranean formation comprises a plurality of wellbores designated n wherein n ranges from 2 to 40.

A seventeenth embodiment which is the method of the thirteenth embodiment wherein the first recovery enhancing fluid system, the second recovery enhancing fluid system or both comprise (i) a recovery enhancing agent (REA) comprising a phosphonoalkyl moiety, (ii) a surfactant, (iii) a miscible fluid and (iv) a base fluid.

An eighteenth embodiment which is the method of the thirteenth embodiment the subterranean formation comprises an ultra-low permeability shale, a fractured reservoir, a carbonate reservoir, a sandstone reservoir, an unconventional reservoir or any combination thereof.

A nineteenth embodiment which is the method of the seventeenth embodiment wherein the recovery enhancing agent comprising a phosphonoalkyl moiety has the general formula where $R^1$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonate, or a hydrogen atom; $R^2$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, a phosphonoalkyl/amine, or a hydrogen atom; $R^3$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonoalkyl/amine, or a hydrogen atom; $R^4$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a beryllium atom, a magnesium atom, a calcium atom, a strontium atom, a barium atom, a chromium atom, an iron atom, a manganese atom, a cobalt atom, a nickel atom, a copper atom, a gallium atom, an indium atom, or a hydrogen atom; $R^5$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a beryllium atom, a magnesium atom, a calcium atom, a strontium atom, a barium atom, a chromium atom, an iron atom, a manganese atom a cobalt atom, a nickel atom, a copper atom, a titanium atom, a gallium atom, a zirconium atom, an indium atom, or a hydrogen atom; x is 1 to 6; y is 0 to 6; and z is 1-6.

A twentieth embodiment which is the method of the seventeenth embodiment wherein the miscible fluid comprises methane, ethane, natural gas, carbon dioxide, propane, butane or a combination thereof.

A twenty-first embodiment which is a method of fracturing a formation comprising placing within an injection well disposed within a subterranean formation a fracturing fluid at a pressure sufficient to induce fractures in the subterranean formation; and placing a foamed recovery enhancing fluid system into the injection well wherein the foamed recovery enhancing fluid system comprises (i) a recovery enhancing agent (REA) comprising a metallated phosphonoalkyl moiety, (ii) a surfactant, (iii) a foaming agent wherein the foaming agent comprises compressed natural gas (CNG), liquified natural gas (LNG), nitrogen, carbon dioxide or a combination thereof; and (iv) a base fluid.

A twenty-second embodiment which is the method of the twenty-first embodiment wherein the subterranean formation is oil-wet.

A twenty-third embodiment which is the method of any of the twenty-first through twenty-second embodiments wherein the subterranean formation comprises calcium carbonate, sodium silicate, aluminum silicate, clayed materials, unconventional shale reservoirs or a combination thereof.

A twenty-fourth embodiment which is the method of any of the twenty-first through twenty-third embodiments further comprising recovering a natural resource from a production well.

A twenty-fifth embodiment which is the method of any of the twenty-first through twenty-fourth embodiments wherein the foaming agent is introduced to the wellbore prior to introduction of the other components of the foamed recovery enhancing fluid system and a foamed recovery enhancing fluid system is formed in situ.

A twenty-sixth embodiment which is the method of any of the twenty-first through twenty-fifth embodiments wherein the recovery enhancing fluid functions as a flowback aid.

A twenty-seventh embodiment which is a method of increasing hydrocarbon recovery during a wellbore fracturing operation comprising placing into a wellbore a foamed recovery enhancing fluid system comprising (i) a recovery enhancing agent (REA) comprising a metallated phosphonoalkyl moiety, (ii) a surfactant, (iii) a foaming agent and (iv) a base fluid.

A twenty-eighth embodiment which is the method of the twenty-seventh embodiment wherein the foaming agent comprises compressed natural gas (CNG), liquified natural gas (LNG), nitrogen, carbon dioxide or a combination thereof The subject matter having been shown and described, modifications thereof can be made by one skilled in the art without departing from the spirit and teachings of the subject matter. The embodiments described herein are exemplary only and are not intended to be limiting. Many variations and modifications of the subject matter disclosed herein are possible and are within the scope of the disclosed subject matter. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). Use of the term "optionally" with respect to any element of a claim is intended to mean that the subject element is required, or alternatively, is not required. Both alternatives are intended to be within the scope of the claim. Use of broader terms such as comprises, includes, having, etc. should be understood to provide support for narrower terms such as consisting of, consisting essentially of, comprised substantially of, etc.

Accordingly, the scope of protection is not limited by the description set out above but is only limited by the claims which follow, that scope including all equivalents of the subject matter of the claims. Each and every claim is incorporated into the specification as some embodiments of the present disclosure. Thus, the claims are a further description and are an addition to the embodiments of the present invention. The discussion of a reference herein is not an admission that it is prior art to the presently disclosed subject matter, especially any reference that may have a publication date after the priority date of this application. The disclosures of all patents, patent applications, and publications cited herein are hereby incorporated by reference, to the extent that they provide exemplary, procedural or other details supplementary to those set forth herein.

We claim:

1. A method of producing natural resources from a wellbore penetrating a subterranean formation with a Huff and Puff process comprising:
   (a) placing a recovery enhancing fluid system into the wellbore during an injection (Huff) period of time wherein placing the recovery enhancing fluid system comprises injecting under pressure;
   (b) ceasing injection of the recovery enhancing fluid system and allowing the composition to soak in the subterranean formation for a soak period of time;
   (c) producing fluids from the subterranean formation during a production (Puff) period of time; and
   (d) optionally repeating steps (a) to (c) for a plurality of Huff, soak, and Puff periods of time, respectively;
   wherein the recovery enhancing fluid system comprises (i) a recovery enhancing agent (REA) comprising a phosphonoalkyl moiety, (ii) a surfactant, (iii) a miscible fluid and (iv) a base fluid;
   wherein the recovery enhancing agent comprising a phosphonoalkyl moiety has the general formula

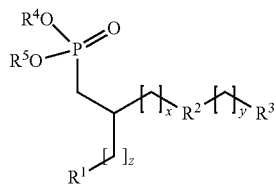

where $R^1$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonate, or a hydrogen atom;

$R^2$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, a phosphonoalkyl/amine, or a hydrogen atom;

$R^3$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonoalkyl/amine, or a hydrogen atom;

$R^4$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a beryllium atom, a magnesium atom, a calcium atom, a strontium atom, a barium atom, a chromium atom, an iron atom, a manganese atom, a cobalt atom, a nickel atom, a copper atom, a gallium atom, an indium atom, or a hydrogen atom;

$R^5$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a beryllium atom, a magnesium atom, a calcium atom, a strontium atom, a barium atom, a chromium atom, an iron atom, a manganese atom a cobalt atom, a nickel atom, a copper atom, a titanium atom, a gallium atom, a zirconium atom, an indium atom, or a hydrogen atom;

x is 1 to 6;
y is 0 to 6; and
z is 1-6; and
wherein the surfactant comprises:
   (a) a sulfate-capped primary branched or secondary propoxylated alcohol, a polyethylene glycol-initiated polyol, an ethylene glycol derivative or a combination thereof; or
   (b) diethanolamide of a tall oil fatty acid, a sorbitol-initiated polyol or a combination thereof.

2. The method of claim 1 wherein the wellbore comprises a single well and wherein the single well is not in fluid communication with another wellbore penetrating a subterranean formation.

3. The method of claim 1 wherein the wellbore is in fluid communication with a plurality of wellbores penetrating a subterranean formation.

4. The method of claim 1 wherein the REA is present in an amount of from about 0.1 wt. % to about 10 wt. %.

5. The method of claim 1 wherein the base fluid comprises an aqueous fluid.

6. The method of claim 1 wherein the surfactant is (a) a sulfate-capped primary branched or secondary propoxylated alcohol, a polyethylene glycol-initiated polyol, an ethylene glycol derivative or a combination thereof.

7. The method of claim 1 wherein the surfactant is (b) a diethanolamide of a tall oil fatty acid, a sorbitol-initiated polyol or a combination thereof.

8. The method of claim 1 wherein the surfactant is present in an amount of from about 0.01 wt. % to about 2.0 wt. %.

9. The method of claim 1 wherein the miscible fluid comprises methane, ethane, natural gas, carbon dioxide, propane, butane or a combination thereof.

10. The method of claim 1 wherein the miscible fluid is present in an amount of from about 10 wt. % to about 85 wt. %.

11. The method of claim 1 wherein the recovery enhancing agent (REA) comprises N-(phosphonomethyl) iminodiacetic acid or salts thereof.

12. The method of claim 6 wherein the recovery enhancing agent (REA) comprises N-(phosphonomethyl) iminodiacetic acid or salts thereof.

13. The method of claim 7 wherein the recovery enhancing agent (REA) comprises N-(phosphonomethyl) iminodiacetic acid or salts thereof.

14. A method of enhanced oil recovery comprising:
(a) injecting in subterranean formation during a Huff period of time a first recovery enhancing fluid system into a first plurality of wellbores and injecting a second recovery enhancing fluid system into a second plurality of wellbores wherein the first and second recovery enhancing fluid systems may be the same or different;
(b) ceasing injection of the recovery enhancing fluid system and allowing the composition to soak in the subterranean formation for a soak period of time;
(c) producing fluids from the subterranean formation during a Huff period of time; and
(d) optionally repeating steps (a) to (c) for a plurality of Huff, soak, and Puff periods of time, respectively;
wherein the recovery enhancing fluid system comprises (i) a recovery enhancing agent (REA) comprising a phosphonoalkyl moiety, (ii) a surfactant, (iii) a miscible fluid and (iv) a base fluid;
wherein the recovery enhancing agent comprising a phosphonoalkyl moiety has the general formula

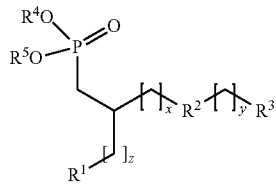

where $R^1$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonate, or a hydrogen atom;

$R^2$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, a phosphonoalkyl/amine, or a hydrogen atom;

$R^3$ is selected from an alkyl having from 1 to 10 carbon atoms, an alkenyl having from 1 to 10 carbon atoms, an alkynyl having from 1 to 10 carbon atoms, an acyl, an aryl, an acetate, a phosphonoalkyl/amine, or a hydrogen atom;

$R^4$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a beryllium atom, a magnesium atom, a calcium atom, a strontium atom, a barium atom, a chromium atom, an iron atom, a manganese atom, a cobalt atom, a nickel atom, a copper atom, a gallium atom, an indium atom, or a hydrogen atom;

$R^5$ is selected from an alkyl having from 1 to 6 carbon atoms, an alkenyl having from 1 to 10 carbon atoms, an alkynyl having from 1 to 10 carbon atoms, an acyl, an aryl, an acetate, a phosphonate, an ammonium cation, a lithium atom, a sodium atom, a potassium atom, a cesium atom, a beryllium atom, a magnesium atom, a calcium atom, a strontium atom, a barium atom, a chromium atom, an iron atom, a manganese atom a cobalt atom, a nickel atom, a copper atom, a titanium atom, a gallium atom, a zirconium atom, an indium atom, or a hydrogen atom;

x is 1 to 6.
y is 0 to 6; and
z is 1-6; and
wherein the surfactant comprises:
(a) a sulfate-capped primary branched or secondary propoxylated alcohol, a polyethylene glycol-initiated polyol, an ethylene glycol derivative or a combination thereof; or
(b) diethanolamide of a tall oil fatty acid, a sorbitol-initiated polyol or a combination thereof.

15. The method of claim 14 wherein the soak period ranges from about 1 day to about 30 days.

16. The method of claim 14 wherein the subterranean formation comprises a single wellbore.

17. The method of claim 14 wherein the subterranean formation comprises a plurality of wellbores designated ii wherein n ranges from 2 to 40.

18. The method of claim 14 wherein the subterranean formation comprises an ultra-low permeability shale, a fractured reservoir, a carbonate reservoir, a sandstone reservoir, an unconventional reservoir or any combination thereof.

19. The method of claim 14 wherein the miscible fluid comprises methane, ethane, natural gas, carbon dioxide, propane, butane or a combination thereof.

20. The method of claim 14 wherein the recovery enhancing agent (REA) comprises N-(phosphonomethyl) iminodiacetic acid or salts thereof.

21. The method of claim 19 wherein the recovery enhancing agent (REA) comprises N-(phosphonomethyl) iminodiacetic acid or salts thereof.

* * * * *